United States Patent [19]
Meisner et al.

[11] Patent Number: 6,005,642
[45] Date of Patent: *Dec. 21, 1999

[54] TELEVISION RECEIVER WITH DOORS FOR ITS DISPLAY SCREEN WHICH DOORS CONTAIN LOUDSPEAKERS

[75] Inventors: Edward Herman Meisner, Short Hills; Michael Patrick Ballone, New Providence, both of N.J.; Keith Kristiansen, Stratford, Conn.; John Flick Garrison, Allendale, N.J.; Allen LeRoy Limberg, Vienna, Va.

[73] Assignee: Samsung Electronics Co., Ltd., Kyungki-do, Rep. of Korea

[ * ] Notice: This patent is subject to a terminal disclaimer.

[21] Appl. No.: 08/860,699
[22] PCT Filed: May 16, 1996
[86] PCT No.: PCT/US96/06555
  § 371 Date: Jul. 9, 1997
  § 102(e) Date: Jul. 9, 1997
[87] PCT Pub. No.: WO97/43852
  PCT Pub. Date: Nov. 20, 1997

Related U.S. Application Data

[63] Continuation-in-part of application No. 08/388,064, Feb. 10, 1995, Pat. No. 5,675,426.

[51] Int. Cl.$^6$ ............... H04N 5/64; H04R 25/00
[52] U.S. Cl. .......... 348/838; 348/827; 381/386
[58] Field of Search .................. 348/826–828, 348/836–838, 726, 729, 787–789, 791, 794; 345/156; 381/24, 87, 88, 90, 188, 205, 332, 361, 386, 387, 396; H04N 5/64; H04R 25/00

[56] References Cited

U.S. PATENT DOCUMENTS

| | | | |
|---|---|---|---|
| D. 208,330 | 8/1967 | Roegner | D56/4 |
| 2,547,447 | 4/1951 | Boer | 181/31 |
| 2,789,158 | 4/1957 | Livingston | 178/5.8 |
| 2,923,370 | 2/1960 | De Capite | 181/31 |
| 3,572,866 | 3/1971 | Wolanin | 312/8 |
| 3,627,392 | 12/1971 | Ruppersburg | 312/8 |
| 3,680,936 | 8/1972 | Backhaus | 312/7 |
| 3,926,487 | 12/1975 | Reyes | 312/223 |
| 4,070,546 | 1/1978 | Hirota | 179/1 GA |
| 4,177,484 | 12/1979 | Boje | 358/254 |
| 4,303,807 | 12/1981 | Sato | 179/146 |
| 4,524,384 | 6/1985 | Lefkowitz et al. | 358/108 |
| 4,525,746 | 6/1985 | Mangold et al. | 358/254 |
| 4,528,597 | 7/1985 | Klein et al. | 358/254 |
| 4,597,470 | 7/1986 | Takagi et al. | 181/141 |
| 4,630,821 | 12/1986 | Greenwald | 273/85 |

(List continued on next page.)

FOREIGN PATENT DOCUMENTS

| | | | |
|---|---|---|---|
| 0070337 | 1/1983 | European Pat. Off. | |
| 0 304 629 | 3/1989 | European Pat. Off. | H04N 5/64 |
| 967739 | 12/1957 | Germany . | |
| 6-70269 | 3/1994 | Japan | H04N 5/64 |
| 2 252 003 | 7/1992 | United Kingdom | H04N 5/64 |
| 2 269 516 | 2/1994 | United Kingdom | H04N 5/64 |

OTHER PUBLICATIONS

International Search Report.

*Primary Examiner*—Kim Yen Vu
*Assistant Examiner*—Joseph R. Pokrzywa
*Attorney, Agent, or Firm*—Sughrue, Mion, Zinn Macpeak & Seas, PLLC

[57] ABSTRACT

A light-in-weight portable television receiver or computer monitor has doors that close over its display screen, to facilitate it being transported by a child of nine or ten years of age. The display screen is substantially vertical during normal viewing. These doors have loudspeakers on their interior surfaces, which doors open out from the sides of the cabinet to space the loudspeakers further apart for better stereophonic sound reproduction. Console or hutch types of cabinets for television receivers can also employ left- and right-swinging doors over the display screen and include stereophonic loudspeakers in the doors.

63 Claims, 11 Drawing Sheets

U.S. PATENT DOCUMENTS

| | | | |
|---|---|---|---|
| 4,696,037 | 9/1987 | Fierens | 381/24 |
| 4,769,634 | 9/1988 | Killian, Jr. et al. | 340/720 |
| 4,903,300 | 2/1990 | Polk | 381/24 |
| 5,119,421 | 6/1992 | Reime | 381/24 |
| 5,138,462 | 8/1992 | Skovgaard | 358/254 |
| 5,164,830 | 11/1992 | Kim | 358/191.1 |
| 5,214,514 | 5/1993 | Haberkern | 358/335 |
| 5,216,211 | 6/1993 | Renk, Jr. | 181/153 |
| 5,243,434 | 9/1993 | Nodama | 358/249 |
| 5,315,663 | 5/1994 | Thiele | 371/188 |
| 5,343,257 | 8/1994 | Kohno et al. | 348/842 |
| 5,361,406 | 11/1994 | Wignot et al. | 455/200 |
| 5,448,647 | 9/1995 | Koizumi | 381/90 |
| 5,452,025 | 9/1995 | Koizumi | 348/805 |
| 5,548,657 | 8/1996 | Fincham | 381/182 |
| 5,675,426 | 10/1997 | Meisner et al. | 348/838 |

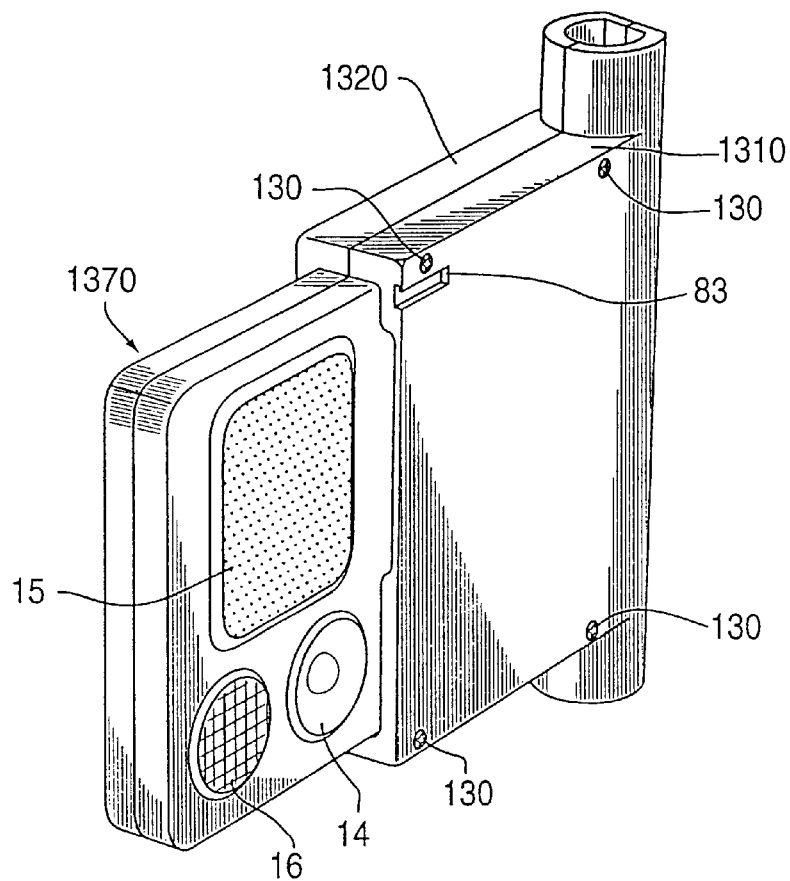
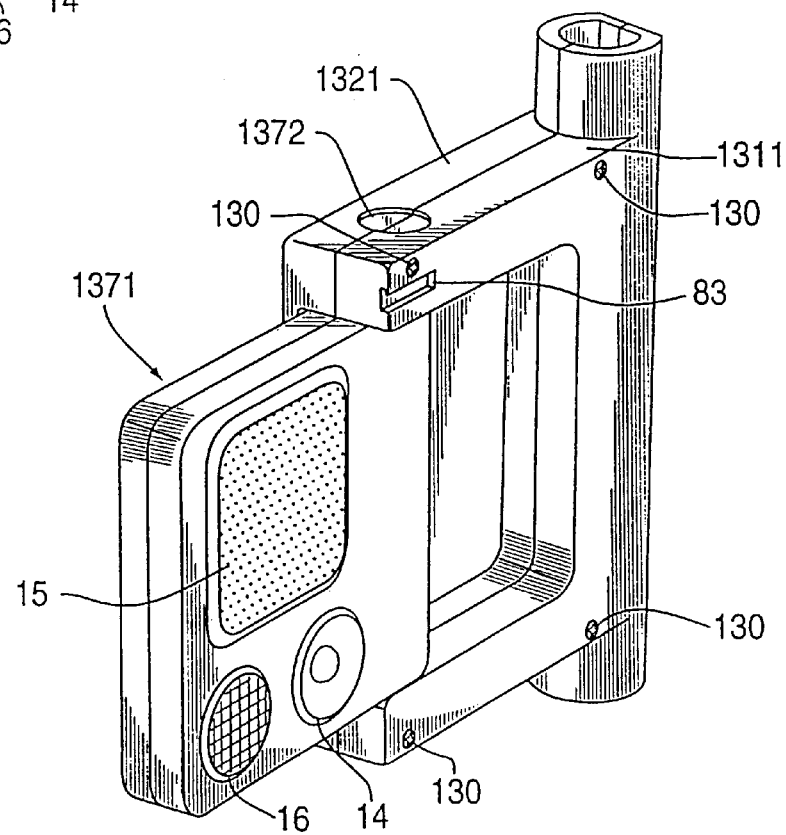
FIG. 5
FIG. 6

TELEVISION RECEIVER WITH DOORS FOR ITS DISPLAY SCREEN WHICH DOORS CONTAIN LOUDSPEAKERS

The present application is the National Stage application of PCT/US 9406555 filed May 16, 1996, which is a continuation in part of U.S. Ser. No. 08/388,064 filed Feb. 10, 1995 and now U.S. Pat. No. 5,675,426.

The invention relates to television receivers having display screens with doors and, more particularly, to such television receivers having loudspeakers in their doors.

BACKGROUND OF THE INVENTION

A portable television receiver particularly suited for the youth market is a concept of the inventors, which television receiver is small enough and light enough to be easily transported by a child of nine or ten years of age and is suited for the playing of video games. In the interest of eliminating battery weight such television receiver, though portable, is normally powered by connection to electric power mains. A portable computer monitor particularly suited for the youth market, which computer monitor is small enough and light enough to be easily transported by a child of nine or ten years of age and is suited for the playing of video games, is a related concept of the inventors. Such a television set or computer monitor is termed "child-transportable" in this specification. Such a "child-transportable" television set or computer monitor is likely to be frequently moved by children apt to be careless when their thoughts are distracted by the prospect of playing video games. Protective covering of the display screen to reduce the likelihood of damage to the kinescope or liquid crystal display device during such moving (and of possible consequent injury to a child) is accordingly contemplated.

Moreover, the doors for closing over the display screen are hinged in order to facilitate the making of a portable television receiver that is "child-transportable", permitting the child to carry the receiver using handles on the left and right sides of the cabinet in a two-handed carry with the closed doors resting against the lower front torso. The portable television receiver designed particularly for the American youth market and for the playing of video games includes a supporting base for the cabinet, and a swivel-and-tilt mechanism, which not only facilitates adjusting the direction of direct viewing to suit a human viewer, but which alternatively facilitates adjusting the direction stereophonic music is radiated from the loudspeakers in the doors to suit a human listener.

U.S. Pat. No. 3,627,392 issued Dec. 14, 1971 to Finley Ruppersburg is entitled STEREO SOUND REPRODUCTION SYSTEM. Ruppersburg describes portable stereophonic-sound reproduction apparatus with a case having left-hand and right-hand swinging doors that open from the front of the case to a spread position. Loudspeakers mounted in the doors are arranged for directing stereophonic sound when the doors are opened to the spread position. The case encloses a swing-down phonograph record player with associated playback electronics.

Portable television receivers and computer monitors have used swiveled cabinets to facilitate adjusting the normal viewing direction. U.S. Pat. No. 5,243,434 issued Sep. 7, 1993 to Takashi Nodama and entitled SWIVEL DEVICE FOR A TELEVISION RECEIVER is evidence of this. The United Kingdom patent application GB 2 252 003 A of Jeong-Seop Lee and Woo-Jin Kim published Jul. 22, 1992 and entitled TURNTABLE FOR TELEVISION RECEIVER describes the use of a motorized turntable for adjusting the normal viewing direction of a television receiver provided with loudspeakers contained within the cabinet body that encloses the kinescope and positioned at the left and at the right of the kinescope viewing screen.

Large console and hutch television receivers of the past have employed doors to hide their display screens when the receivers are shut off; the doors were used primarily for cosmetic reasons, so as not to have to see the dead eye of a rasterless kinescope. At one time roll-front cabinets were common for European television receivers, the roll-front doors taking up less room when opened. Doors have also been used for cosmetic reasons in stereophonic audio systems. In U.S. Pat. No. 5,119,421 issued Jun. 2, 1992 and entitled STEREO SYSTEM CABINET WITH LOUDSPEAKER DOOR ASSEMBLY, Reime describes a stereo system cabinet with front-opening loudspeaker panels that pivot around vertical axes, which close as doors when the stereo system cabinet is not in use. The loudspeakers are mounted in the lower portions of the doors, which have their upper portions closing over a shelf that can hold a "table model" color television receiver; so the problem of the permanent magnets in the loudspeaker motors affecting the color purity of the color television receiver is not addressed. The use of doors in such large television and audio equipment is somewhat cumbersome. So, in most homes the doors tend to be left open unless the preacher or some other important guest comes to call. The tendency to close the doors but seldom and the cost of the doors, particularly when finished in fine wood veneers, has reduced the market for television receivers with doors for hiding their display screens. Making swinging cabinet doors high enough to separately cover a television display screen and loudspeakers, as Reime does, tends to make the doors heavier and more prone to warpage.

Furthermore, a problem with the stereophonic-sound reproduction apparatus provided with stereophonic loudspeakers in left-hand and right-hand swinging doors, as thusfar described, is that the movement of the cabinet body, so as to direct the stereophonic sound in a direction desired by a human listener, may result in the scratching of the surface on which the cabinet body rests. In the case of a console or hutch cabinet, which tends to be quite heavy, movement of the cabinet body may scratch a hardwood, linoleum or linoleum-tile floor that supports the cabinet body. In the case of portable stereophonic-sound reproduction apparatus, its movement so as to direct the stereophonic sound in a direction desired by a human listener may scratch the top of the table or desk that supports the cabinet body. While the portable stereophonic-sound reproduction apparatus is less heavy in weight than stereophonic reproduction apparatus in a console or hutch cabinet, the table or desk that supports the cabinet body may have a fine-furniture finish that is more apt to be scratched than a hardwood floor.

Doors are not used primarily for cosmetic purposes in portable television receivers or computer monitors that embody the present invention. Rather, the doors are designed so that they can be transported by a child and are used primarily for protecting the display screens during transport in order to reduce the likelihood of damage to the kinescopes or liquid crystal display devices (and of possible consequent injury to the child). The smaller size of these doors avoids their being cumbersome, even though they are front-opening hinged doors, rather than roll-front doors. When the left- and right-swinging doors that can close over the display screen and include stereophonic loudspeakers in the doors, are opened to a spread position, the stereophonic loudspeakers flank the display screen, rather than being located below the television receiver display screen.

Stereophonic sound is provided for some television broadcasts and for some video games, and there is a problem with separating the loudspeakers of a portable television receiver sufficiently to achieve directional sound reproduction. Satellite loudspeakers connected by cabling to the portable television receiver can be used to overcome this problem. However, the satellite loudspeakers interfere with ready portability, are likely to be lost by a child during transport, and contribute to the cluttering up of the household by child's play. The mounting of the stereophonic loudspeakers in doors opening to the left and to the right of the display screen provides separation sufficient to achieve directional sound reproduction for a child seated close to the portable television receiver, close seating being normal with the small screen sizes associated with a receiver small enough to be transported by a child. Hinged doors, including a left door hinged from the cabinet for covering the left-hand side of the display screen when closed and for extending from the left-hand side of the cabinet when opened, and including a right door hinged from the cabinet for covering the right-hand side of the display screen when closed and for extending from the right-hand side of the cabinet when opened, not only protect the kinescope or liquid crystal display device during transport. During transport, such doors also protect the loudspeakers mounted on the insides of those doors as closed over the display screen.

In U.S. Pat. No. 2,547,447 issued Apr. 3, 1951 and entitled APPARATUS FOR STEREOPHONIC SOUND REPRODUCTION, de Boer describes the mounting of stereophonic loudspeakers on right and left sliding doors of a stereophonic radio receiver. In de Boer's apparatus, the loudspeakers are mounted to have their openings on the outside of the right and left sliding doors as closed over the radio receiver, which tends to leave the loudspeakers inadequately protected during transport. For example, when transport is from one building to another during a rainstorm, water is likely to enter the speaker opening. Mounting the loudspeakers on the insides of hinged doors that close over the display screen can provide protection from such event, since the cabinet and doors of a child-transportable television receiver or computer monitor generally will be made of an engineering plastic material impervious to water.

The mounting of loudspeakers in doors covering the display screen of a television receiver during transport involves considerations not encountered by de Boer or Reime, concerning the interaction of magnetic fields emanating from the loudspeakers magnetizing metal components near the display screen when the doors are closed over the display screen, it is here pointed out. Permanent magnets in the drive motors of the loudspeakers distort the magnetic conditions near the faceplate of a color kinescope, for example. Magnetization of metal components near the display screen creates local magnetic fields that affect the landing of the electronic beams on a pattern of display-screen phosphors creating color purity problems.

As is well known to the designers of color television receivers, the shadow mask or aperture grill within a kinescope is commonly made of ferrous metal and is subject to magnetization when exposed to magnetic fields, even such weak ones as the earth's magnetic field. Any change in such magnetization, such as occurs during the changing of the television receivers position within the earth's magnetic field, affects the deflection of the three electron beams that respectively scan red-emitting phosphors, green-emitting phosphors and blue-emitting phosphors in the display screen, leading to a loss of proper color registration that is quite objectionable to human viewers. To counter such loss of color registration and maintain color purity, the color kinescope is commonly provided with built-in degaussing coils that, when the television receiver has its power first turned on after being off for some time, are briefly energized for de-magnetizing the shadow mask or aperture grill. Powering up of the receiver before the doors over the display screen are opened up and locked or left in an open position interferes with the automatic de-gaussing coil removing magnetic field anomalies near the display screen induced by magnetic fields emanating from the loudspeakers, however, it is here pointed out. Accordingly, if an aperture grill color kinescope, shadow mask color kinescope, or related type of color kinescope is used as the display device in a child-transportable television receiver or computer monitor, equipped with loudspeakers in doors hinged to close over the display screen, the automatic de-gaussing should be deferred until after the doors are opened up and locked or left in an open position, it is here pointed out. This can be done, also deferring the application of power to the television receiver or computer monitor until the doors are opened up and locked or left in the open position, it is here pointed out.

The color purity problems posed by including loudspeakers in doors hinged to close over the display screen can be mitigated or avoided in other ways, it is here pointed out. The use of non-magnetic materials in the aperture grill or shadow mask, the chassis and the kinescope mounts reduces color purity problems supposing an aperture grill color kinescope, shadow mask color kinescope, or related type of color kinescope is used as the display device. The use of engineering plastics in a child-transportable television receiver or computer monitor is attractive anyway for reducing weight and for providing resistance to damage resulting from accidental dropping or banging against other objects. The loudspeaker motors can be constructed to avoid the use of permanently magnetized structures, being constructed entirely using electromagnetic structures. Indeed, the motors of the loudspeakers in the doors can be of an electrostatic type rather than an electromagnetic type, better to avoid magnetic structures. Since small electrostatic loudspeakers with good lower frequency response are a problem, the loudspeakers in the doors can be aided by a lower-frequency-response loudspeaker of electromagnetic type located in the main body of the cabinet or in a base therefor. The color purity problems can be avoided by replacing the standard color kinescope with another color display device, such as a liquid crystal color display device, or such as a single-gun kinescope using controlled-penetration phosphors, which can be of "onion-skin" type by way of example. A more conventional color kinescope is favored, however, because of its lower cost.

The stereophonic loudspeakers in display-screen doors concept used in the portable television receiver particularly suited for the youth market appears to be so attractive that the concept is being extended across a full line of color television receivers for the American market including non-portable table-top receivers and stand-on-the-floor console receivers. The concept will also be employed in computer monitors. American television receivers are peculiar in their styling compared to television receivers in the rest of the world. Rather than using flush mounting of the kinescope screens in their cabinetry, which is common in the rest of the world, especially Europe, American television receivers and computer monitors usually have their kinescope screens mounted behind a bezel that forms a "picture frame" for the human viewer, which American customers prefer.

The portable television receiver designed particularly for the American youth market and for the playing of video games uses a kinescope with a flat face and a deep surrounding bezel, to reduce incident light falling on the screen during daytime play, and to give the child the feeling he was in his own world secured from the intrusion of adults. A possible mitigation of the problem of the shadow mask or aperture grill of the kinescope being magnetized by the permanent magnets in the motors of the door-mounted loudspeakers was another factor in evaluating a deep-bezel design in premarketing studies of possible cabinet design. A kinescope driven from portable television electronics already in production and using conventional de-gaussing procedures when the television receiver has its power first turned on after being off for some time was used in the pilot deep-bezel-design television receiver.

Surprisingly, when the pilot deep-bezel-design television receiver was operated, there was no evidence of the expected problem of the shadow mask or aperture grill of the kinescope being magnetized by the permanent magnets in the motors of the door-mounted loudspeakers, solutions to which problem are noted above. In retrospect, this appears to be because the magnetic flux leakage from modern loudspeaker motors is kept quite small by the high permeability of the materials used in the permanent magnets to keep motor weight down and by the magnetic structures employed. The paths of the loudspeakers when swung toward the screen are retraced when the doors are opened, so the resultant change in the magnetic field tends towards being zero. Simply using a bezel and door design in which the permanent magnets in the motors of the door-mounted loudspeakers are held a few centimeters from the face of the kinescope screen avoids the problem of the shadow mask or aperture grill of the kinescope being magnetized sufficiently to affect color purity noticeably.

Furthermore, the pilot deep-bezel-design television receiver used a monophonic low-frequency-range loudspeaker, or "woofer", that was mounted in the television receiver cabinet at some location removed from the kinescope screen. Human beings detect stereophonic separation effects primarily at mid frequencies, particularly when loudspeaker separation distances are less than four or five feet. Since stereophonic separation effects at low frequencies are not pronounced, the use of a monophonic woofer when loudspeaker separation distances are constrained to less than four or five feet is common in less-expensive stereophonic reproduction systems, particularly, those of console type. In order to maintain acoustic coupling at low frequencies to the room in which the listener is positioned, woofers generally have larger surfaces (cones) to be driven by their motors than loudspeakers for higher frequencies do. In order that woofers can drive these larger surfaces, the permanent magnets in the motors of woofers are commonly larger and of greater field strength than the permanent magnets in the motors of mid-frequency-range loudspeakers or in the motors of certain types of high-frequency-range loudspeakers, or "tweeters". Not having woofers in the doors of the pilot deep-bezel-design television receivers helps avoid the problem of the shadow mask or aperture grill of the kinescope being magnetized sufficiently to affect color purity noticeably. This permits the bezel depth in a deep-bezel-design television receiver to be made shallower, without incurring loss of color purity owing to kinescope magnetization by the loudspeaker motors.

Other factors are considered in the design of a child-transportable television receiver or computer monitor. To keep the cabinet weight down to facilitate transportation by a child, a design without 50/60 Hz power transformer is used. The cabinet exclusive of its hinged doors over the display screen completely surrounds that portion of the apparatus used for generating the images on the display screen, and is free from voids that would allow the insertion of objects into the chassis that would pose an electric shock hazard. The cabinet is preferably designed to encourage two-handed carrying by the child, with the display screen doors against the stomach of the child. This lessens the chance of injury during lifting and reduces the likelihood of dropping the apparatus or of banging its cabinet into other persons or objects. Carrying handles, if they are provided, are preferably on the sides of the cabinet or underneath the cabinet to discourage one-handed carrying by the child. The cabinet when closed for carrying by a child is designed with large-radius rounded corners to reduce the likelihood of the child injuring himself, another child, doorways or walls of a house, furniture in a house, or a vehicle. Yielding or cushioned surfaces on the cabinet are preferable, if cost considerations can be met. The hinges on the cabinet doors and any locking mechanisms on the doors are designed to avoid the possibility of pinching fingers or other body parts.

The hinges on the cabinet doors are of such sturdy construction that the cabinet doors cannot be torn off the cabinet. If the hinges use hingepins (being of piano type, for example, the ends of each hinge are provided with guards to forestall the hingepin being extracted by a child. The conduction of electric driving signals to the loudspeakers in the doors should be done such that the conductors are not easily susceptible to a child's tampering. The power cord is preferably retractable into the cabinet during transportation of the child-transportable television receiver or computer monitor. Apparatus to play a prerecorded "pull the plug" reminder message can be included in the child-transportable television receiver or computer monitor and actuated by the child lifting the receiver or monitor from a position of rest. The apparatus to play the reminder message can be similar to that used in some toys (such as talking dolls, for example).

SUMMARY OF THE INVENTION

The invention in one of its aspects is embodied in a child-transportable television receiver or computer monitor having doors that cover its display screen during transport. Stereophonic loudspeakers mounted in doors opening to the left and to the right of the display screen provide separation sufficient to achieve directional sound reproduction for a child seated close to the portable television receiver. If the display is provided by a kinescope, it is a low-emission type that is safe for such close seating.

In a portable television receiver or computer monitor using a color kinescope, having doors that cover its display screen during transport, and having stereophonic loudspeakers mounted in doors opening to the left and to the right of the display screen, in a further aspect of the invention automatic de-gaussing is deferred until after the doors over the display screen are opened up and locked or left in a spread open position. This facilitates correction of remnant magnetic field anomalies near the display screen previously induced by magnetic fields emanating from the loudspeakers.

A portable television receiver or computer monitor constructed in accordance with another aspect of the invention uses a liquid crystal color display device rather than a color kinescope, has doors that cover its display screen during transport, and has stereophonic loudspeakers mounted in doors opening to the left and to the right of the display screen. The liquid crystal color display device is unaffected by any magnetic fields emanating from the loudspeakers when the doors are closed over the display screen.

A television receiver or computer monitor constructed in accordance with another aspect of the invention has a color kinescope subject to loss of color purity because of change in magnetic field, a bezel frame surrounding the face of the kinescope display screen, right and left doors which close over its display screen and the surrounding bezel frame, and right and left loudspeakers on the interior surfaces of its right and left doors, which loudspeakers have motors with permanent magnets therein. The doors open out from the sides of the cabinet to space the loudspeakers further apart for better stereophonic sound reproduction. The loudspeakers have motors including respective permanent magnet components. The mounting of the loudspeakers within the doors and the bezel frame recessing the face of the display screen from the front side of the cabinet are dimensioned to keep the permanent magnet components of the loudspeaker motors a few centimeters away from the face of the display screen, such that no appreciable loss of color purity because of change in magnetic field is apparent when the doors are opened, resulting from the proximity of the permanent magnet components of the loudspeaker motors to the face of the display screen of the kinescope when the doors have been closed.

A portable television receiver or computer monitor constructed in accordance with another aspect of the invention has doors that cover its display screen during transport and has stereophonic loudspeakers mounted in doors opening to the left and to the right of the display screen, which stereophonic loudspeakers are constructed so as not to have permanently magnetized elements therewithin.

Moreover, the problem of the scratching of the surface on which the cabinet body rests is solved in the invention by supporting the cabinet body on a base or stand that need not be moved in order to direct the stereophonic sound in a different direction. Instead, the cabinet body is supported on the base or stand in such a way that it can be easily swiveled respective to the base or stand when it is desired to direct the stereophonic sound in a different direction.

BRIEF DESCRIPTION OF THE DRAWING

FIGS. 5 and 6 are perspective views of different types of doors that can be used in modifications of the FIG. 1 child-transportable television receiver.

DETAILED DESCRIPTION

Figure 1:
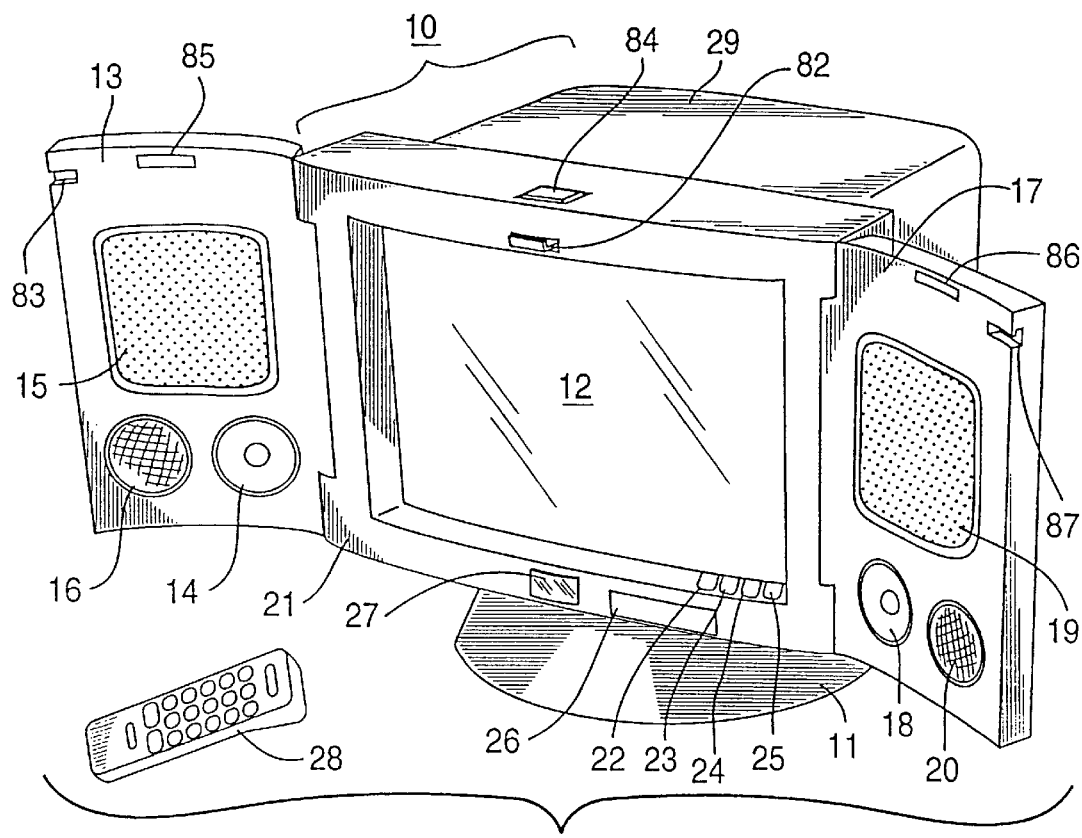
FIG. 1 is a front perspective view of a child-transportable television receiver embodying the invention, having doors that cover the display screen of its color kinescope during transport, and having stereophonic loudspeakers mounted in the doors, which open to the left and to the right of the display screen.

The child-transportable television receiver of FIG. 1 has a cabinet 10, which because of the likelihood of rugged handling and of the desire for light weight is preferably made of an engineering plastic material. The engineering plastic material should be impervious to water. The cabinet 10 is shown as being on a swivel-and-tilt stand 11. A front side of the cabinet 10 has a display screen 12 of a display device such as a low-emission, 33-centimeter-diagonal kinescope disposed therewithin. A left door 13 shown in its fully open position has tweeter, woofer and mid-range loudspeakers 14, 15 and 16 mounted therewithin so they radiate sound from the exposed inner surface of the door. A right door 17 shown in its fully open position has tweeter, woofer and mid-range loudspeakers 18, 19 and 20 mounted therewithin so they radiate sound from the exposed inner surface of the door.

FIG. 1 is drawn presuming the left door 13 to be hinged to the cabinet 10 by lugs extending into holes within the cabinet 10 and presuming the right door 17 to be similarly hinged to the cabinet 10, a hinging arrangement called "opposed pin and eye". Other hinging arrangements are possible, however, such as a strong piano hinge. If a flexible engineering plastic material with sufficient strength after repeated flexing can be found, the hinge may be formed by folding the plastic itself.

The ends of the lugs in the doors 13 and 17 which serve as hingepins in the opposed pin and eye hinging arrangement have holes therein, not visible in FIG. 1. The electrical wires for conducting sound-descriptive signals from the left audio amplifier(s) in the television receiver to the loudspeakers 14, 15 and 16 in the left door 13 are threaded through one or more such holes in the ends of the lugs in the left door 13; and the electrical wires for conducting sound-descriptive signals from the right audio amplifier(s) in the television receiver to the loudspeakers 18, 19 and 20 in the right door 17 are threaded through one or more such holes in the ends of the lugs in the right door 17. Alternatively, the electrical wiring could pass through armored cables connecting between the cabinet 10 and respective ones of the doors 13 and 17, with voids being formed in the doors 13 and 17 to admit the armored cables when those doors are closed over the display screen 12.

The display screen 12 is surrounded by a bezel frame 21 of substantial depth for receiving the domes of the woofer speakers 15 and 19. The bezel frame 21 forms the front portion of the cabinet 10, and the doors 13 and 17 are hinged thereto. The bezel frame 21 and the doors 13 and 17 are provided with rounded corners to reduce the chance of injury to a child carrying the set or falling against the set. The substantial depth of the bezel frame 21 affords somewhat better protection of the display screen 12 from being accidentally banged into and strengthens the bezel frame 21 as a structural member. FIG. 1 shows recessed rocker keys for the principal television set controls being located within the opening of the bezel frame 21, including a rocker key 22 for turning power on and off to the television receiver, a rocker key 23 for controlling audio volume up and down, a rocker key 24 for controlling channel selection up and down, and a rocker key 25 for selecting the source of radio-frequency signal supplied to the television receiver (and in some designs controlling the supply of power to television games used with the television receiver). Alternatively, these rocker key controls 22, 23, 24 and 25 can be located within an inset on the front of the bezel frame 21. A snap-open panel 26 on the front of the bezel frame 21 hides additional, seldom-used controls such as treble and bass controls for audio. The infrared sensor 27 for receiving remote control signals from an infrared remote control 28 is also located on the front of the bezel frame 21. The infrared remote control 28 has keys for controlling all television functions.

As shown in FIG. 1, a spring catch 82 can be installed in the top center front of the bezel frame 21, for engaging the top edges of slots 83 and 87 at the tops of the interior surfaces of the closed doors 13 and 17, to positively hold the doors 13 and 17 closed for transport. A push button 84 in the center top surface of the bezel frame 21 is depressed to release the doors 13 and 17. The tops of the interior surfaces of the closed doors 13 and 17 are provided with compression springs 85 and 86 to spring the doors 13 and 17 open when the push button 84 is depressed to release the spring catch 82. These compression springs 85 and 86 can be leaves of a springing plastic material and it is possible to form them in the interior plastic panels of doors 13 and 17 themselves. Alternatively, the compression springs 85 and 86 can be relocated to the top front surface of the bezel frame 21. Other safety catch arrangements can be used for securing the doors 13 and 17, but they should avoid protruding structures as might injure a child, they should avoid the possibility of a child getting pinched in them, and they should be reasonably simple for a child to operate.

Figure 2:
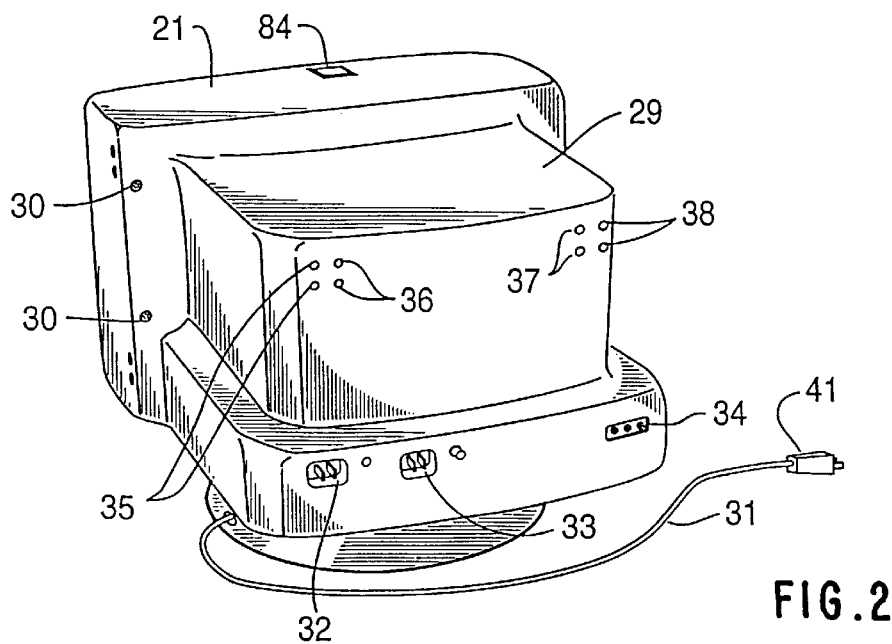
FIG. 2 is a rear perspective view of the child-transportable television receiver of FIG. 1.

FIG. 2 shows the rear of the child-transportable television receiver of FIG. 1. A one-piece engineering plastic rear shell 29, which forms the rear portion of the cabinet 10, joins to the bezel frame 21 and is secured thereto by screws 30. The engineering plastic from which the bezel frame 21 and the rear shell 29 are formed is an electrical insulator, permitting the use of transformerless power supplies in the television receiver without substantial electrical shock hazard. The screws have hour-glass slots or other special-shape slots (e.g., those used for securing auto headlamps) to frustrate a child attempting to separate the rear shell 29 from the bezel frame 21, and a liquid-excluding sealant is used in the joint between the rear shell 29 and the bezel frame 21. The corners of the rear shell 29 are rounded to reduce the chance of injury to a child carrying the set or falling against the set. Preferably, the rear shell 29 is free from accessible holes to reduce the likelihood of a child attempting to poke objects into the receiver electronics and to reduce the likelihood of liquids being spilled into the television receiver. Also, carrying the receiver outdoors during rain or snow is less likely to cause problems. The rear shell 29 can have holes for inserting tools to make hold adjustments, etc. in its bottom surface, so as to be accessible only when the television receiver is dismounted from its swivel-and-tilt stand 11. If ventilation holes to permit heat generated within the television receiver to escape are necessary near the top of the cabinet 10, it is preferable to locate them in the front of the bezel frame 21, where they will be closed off by the doors 13 and 17 when the receiver is transported, so carrying the receiver outdoors during rain or snow is still feasible.

Unlike other portable television receivers, the FIG. 1 receiver is not provided with a top-located handle. This is done to encourage a child transporting the receiver to carry it with two hands, with the closed doors of the receiver against his stomach, since this carrying position is believed to pose less risk of injury to that child than his attempting to carry the receiver with a top-located handle. The swivel-and-tilt stand 11 is constructed so as not to interfere with such two-handed carrying, the center of weight for the set is located slightly to the front of the receiver, and the bottom of the rear shell 29 can have shallow grooves along its left and right sides to improve fingerhold. A power cord 31 is shown leading to a spring cord winder encased within the swivel-and-tilt stand 11, which imposes constraint on the amount of swivel. Alternatively, the spring cord winder can be located in the bottom of the rear shell 29, but this reduces the room for electronics in the rear shell 29 and tends to make the spring cord winder less accessible for servicing. Also, the spring cord winder has to be compartmentalized from the receiver electronics, which complicates the fabrication of the rear shell 29 as a single-unit molding. The loss of room for electronics in the rear shell 29 when the spring cord winder is included therewithin is of increased concern in a computer. In designs where power controls for electronic games are located in the front of the receiver or computer, power connections 32, 33 are provided on a back panel portion of the rear shell 29. This back panel portion of the rear shell 29 also has "antenna" connections 34 provided thereon for receiving radio-frequency signals from video games and from a cable hook-up, outdoor antenna, or video recorder. The FIG. 1 receiver has no rabbit ears or other type of on-set antennas normally found on a portable television receiver, because they might pose danger to a child falling on them when the receiver is set on the floor. Some designs include an interior antenna, which can be used for receiving local UHF broadcasting or VHF television signals rebroadcast on a 920 MHz from a base broadcast television receiver. There are "in" audio/video jacks 35 and "out" audio/video jacks 36 located on the back of the rear shell 29 for connection to a video cassette recorder. There are also "in" left/right stereophonic sound jacks 37 and "out" left/right stereophonic sound jacks 38 located on the back of the rear shell 29.

Figure 3:
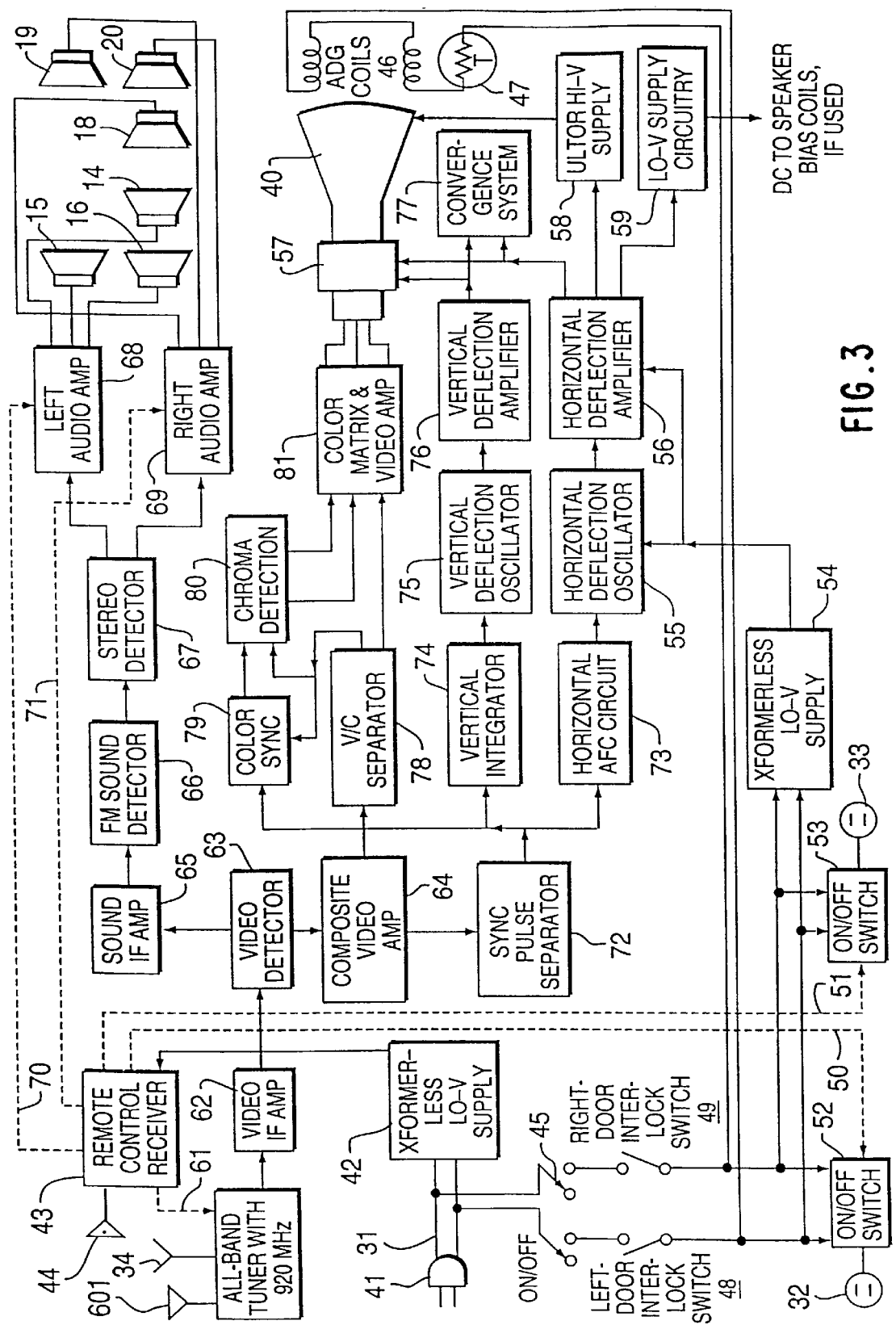
FIG. 3 is a block schematic diagram of the circuitry in the FIG. 1 child-transportable television receiver with doors that cover its kinescope display screen, including in accordance with an aspect of the invention left-door and right-door interlock switches for controlling the application of power to the automatic degaussing (ADG) coils.

FIG. 3 is a block schematic diagram of the circuitry in the FIG. 1 child-transportable television receiver with doors that cover the display screen of its color kinescope 40. When connected to the power main supply, the plug 41 supplies 50/60 Hz alternating current at conventional main supply voltages via the power cord 31 to a transformerless low-voltage supply 42 that rectifies and filters the power line voltage to develop a direct operating voltage for application to remote control receiver circuitry 43. The remote control receiver circuitry 43 responds to a modulated infrared light carrier sensed by a sensor 44 to generate control signals applied to various circuits in the television receiver as will be explained presently. The 50/60 Hz alternating current supplied via the power cord 31 is also supplied to a double-pole/double-throw on/off power switch 45 actuated by the rocker key 22 on the front of the FIG. 1 television receiver. Presuming the on/off power switch 45 to be in its "on" condition, in accordance with an aspect of the invention, the 50/60 Hz alternating current is subsequently selectively applied to a series connection of automatic degaussing coils 46 and a temperature-dependent resistor 47 of posistor type when and only when both a left-door interlock switch 48 and a right-door interlock switch 49 are simultaneously wide open. Accordingly, automatic degaussing takes place only after the loudspeakers 14–16 and 18–20 are swung away from the display screen of the color kinescope 40.

The problems of degaussing the kinescope can be mitigated by using electromagnetic loudspeaker motors that do not employ permanent magnets in their construction. The constant magnetic field for the speaker cone coils to work against can be provided by electromagnets, the magnetic structures of which are of low-magnetic-remnance material and the coils of which are supplied direct current from the low-voltage supply circuitry 59. The constant magnetic field is not established until after the doors 13 and 17 open to render the door interlock switches 48 and 49 conductive.

Responsive to a control signal supplied from the remote control receiver circuitry 43 via a connection 50, and responsive to the condition of the rocker key 25 on the front of the FIG. 1 receiver, an electrically controlled on/off switch 52 selectively applies the 50/60 Hz alternating current made available by the conduction of switches 45, 48 and 49 to the electrical receptacle 32. Responsive to a control signal supplied from the remote control receiver circuitry 43 via a connection 51, and responsive to the condition of the rocker key 25, an electrically controlled on/off switch 53 selectively applies the 50/60 Hz alternating current made available by the conduction of switches 45, 48 and 49 to the electrical receptacle 33.

The remaining portions of the FIG. 3 circuitry resemble those found in previous television receivers. The 50/60 Hz alternating current made available by the conduction of switches 45, 48 and 49 is supplied to a transformerless low-voltage supply 54 that rectifies and filters the power line voltage to develop a direct operating voltage supplied to a horizontal deflection oscillator 55 and to a horizontal deflection amplifier 56 driven therefrom. The horizontal deflection amplifier 56 includes a horizontal-output transformer with a secondary winding for applying horizontal-sweep sawtooth-waveform signal to horizontal-sweep coils in a magnetic deflection yoke 57 associated with the color kinescope 40. Sawtooth voltages are supplied from a tertiary winding of the horizontal-output transformer (as may be bootstrapped to the secondary winding of the horizontal-output transformer) to a high-voltage supply 58, which high-voltage supply 58 supplies ultor voltage to the color kinescope 40 and conventionally includes a voltage tripler therein. The horizontal-output transformer includes at least one additional winding for supplying voltage to be rectified and filtered in the low-voltage supply circuitry 59 for the rest of the television receiver. Since the horizontal-output transformer transforms power at frequencies above 15 kHz, rather than at the 50/60 Hz frequency of the power main supply, less "iron" is required in the transformer for supplying alternating input current to the low-voltage supply circuitry 59. This and the reduction in the size of the capacitors required for smoothing alternating current ripple from the direct operating voltages supplied by the supply circuitry 59, owing to the higher ripple frequency, reduce the weight of the low-voltage supply circuitry. This reduction in weight is of increased significance in a portable television receiver that is to be child-transportable. The electrical isolation provided to the low-voltage supply circuitry 59 by using at least one additional winding on the horizontal-output transformer for supplying voltage to be rectified and filtered avoids power main voltages being applied to the controls of the television receiver as in the case with an all transformerless power supply of the so-called "hot-chassis" type. This reduces shock hazard for a child who pries the knob or key of an electrical control device out of the television receiver with a screwdriver or similar implement.

Radio-frequency television signals received at the "antenna" connections 34 are supplied to a tuner 60, the tuning of which is controlled by either the rocker key 24 on the front of the FIG. 1 receiver or by signal supplied from the remote control receiver circuitry 43 via a connection 61. The tuner 60 preferably is an all-band tuner, capable of receiving cable channels as well as broadcast television channels, and preferably is equipped to receive television signals re-transmitted on a 920 MHz carrier to a small antenna 601 within the receiver cabinet 10. The tuner 60 converts the radio-frequency television signal it selects to a 45 MHz video-intermediate-frequency signal supplied to a video intermediate-frequency amplifier 62. The amplified video-intermediate-frequency signal is supplied to video detector circuitry 63 to be demodulated to recover a composite video signal supplied to a composite-video amplifier 64 and a frequency-modulated 4.5 MHz sound-intermediate-frequency signal supplied to a sound intermediate-frequency amplifier 65. The amplified sound-intermediate-frequency signal is supplied to an FM sound detector 66, which recovers either a baseband audio signal or a composite stereophonic signal supplied to a stereophonic detector 67. The stereophonic detector 67 supplies a left audio signal to left audio amplifier circuitry 68 which supplies the signals for driving the loudspeakers 14–16 in the left door 13 of the FIG. 1 television receiver. The stereophonic detector 67 also supplies a right audio signal to right audio amplifier circuitry 69 which supplies the signals for driving the loudspeakers 18∫20 in the right door 17 of the FIG. 1 television receiver. The left audio amplifier circuitry 68 and the right audio amplifier circuitry 69 receive respective volume control signals from the remote control receiver circuitry 43 via connections 70 and 71, respectively.

A sync pulse separator 72 separates synchronizing pulses from the amplified composite video signal supplied thereto from the composite-video amplifier 64. These synchronizing pulses are supplied to a horizontal AFC circuit 73 that generates an automatic frequency control (AFC) signal from them. This AFC signal is applied to the horizontal deflection oscillator 55 for regulating the fundamental frequency of its oscillations to conform with horizontal line scanning frequency. The synchronizing pulses supplied from the sync pulse separator 72 are applied to a vertical integrator 74 to generate injection locking signals for a vertical deflection oscillator 75 for forcing the frequency of its sawtooth oscillations to conform with vertical field sweep frequency. These vertical sawtooth oscillations are amplified by a vertical deflection amplifier 76, which then applies the vertical-sweep sawtooth-waveform signal to vertical-sweep coils in the magnetic deflection yoke 57 associated with the color kinescope 40. A dynamic convergence system 77 receives, as input signals, the vertical-sweep sawtooth-waveform signal from the vertical deflection amplifier 76 and the horizontal-sweep sawtooth-waveform signal from the horizontal deflection amplifier 56.

The amplified composite video signal from the composite-video amplifier 64 is supplied to luminance/chrominance separation circuitry 78. Color synchronization circuitry 79 receives separated chrominance signal from the separation circuitry 78 and, responsive to horizontal synchronizing pulses in the output signal from the sync pulse separator 72, selects the color burst portions of the separated chrominance signal for synchronizing the oscillations of a local (3.58 MHz) color oscillator. These oscillations are supplied from the synchronization circuitry 79 to chrominance detection circuitry 80 and are used there for synchronously detecting the separated chrominance signal supplied from the separation circuitry 78 to the chrominance detection circuitry 80. The synchronous detection of the separated chrominance signal results in color difference signals which are supplied together with the separated luminance signal from the luminance/chrominance separation circuitry 78 to color matrixing and video amplifier circuitry 81. This circuitry 81 combines the color difference signals with the separated luminance signal to generate red, green and blue color signals which are amplified and used for controlling the emission of electrons from the red, green and blue electron guns in the color kinescope 40. In the protracted absence of color burst signal, as occurs when receiving black-and-white broadcasts or very-weak-signal color broadcasts, the synchronous detection of the separated chrominance signal in the chrominance detection circuitry 80 is discontinued; and the color matrixing and video amplifier circuitry 81 controls the emission of electrons from the red, green and blue electron guns in the color kinescope 40 so as to generate monochromatic response on the display screen.

Figure 4:
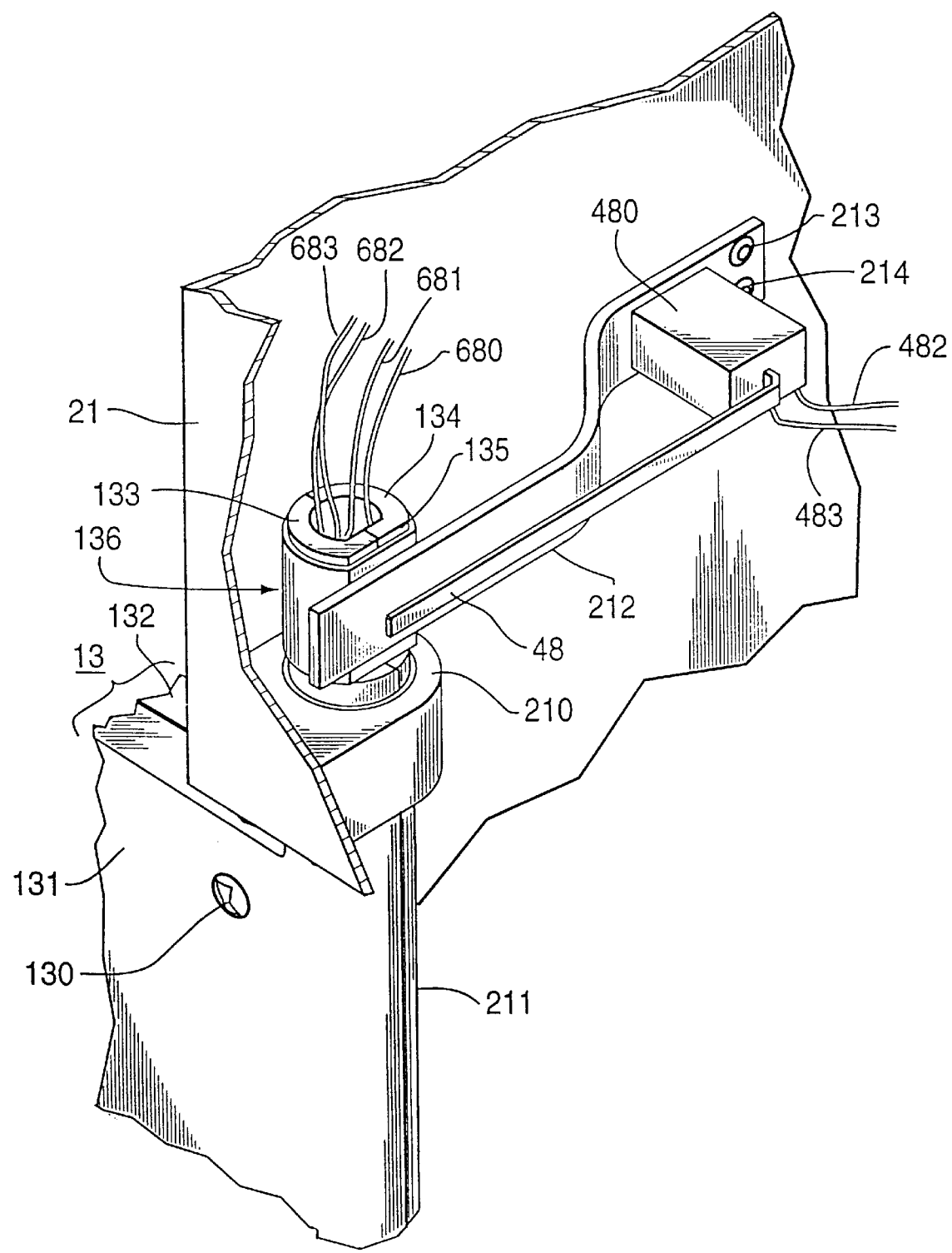
FIG. 4 is a perspective view of the interior of a portion of the bezel frame of the FIG. 1 child-transportable television receiver with loudspeakers in its doors, showing in detail one of the door hinges, one way to feed the connection wires for the loudspeakers from the receiver cabinet into its doors, and one way to implement a door interlock switch.

FIG. 4 shows in detail the top door hinge of the left door 13 of the FIG. 1 child-transportable television receiver with loudspeakers in its doors. The left front portion of the bezel frame 21 at the left of FIG. 4 is cut away. The door 13 has an interior side 131 and an exterior side 132 formed as separate plastic moldings and joined together, possibly with an adhesive cement, and held together by a plurality of self-tapping screws 130 (of which one is shown) that have hour-glass or other special-shape slots. The sides 131 and 132 have respective portions 133 and 134 that join together to form a pin for a pin-and-eye hinge, the eye 210 of which is molded into the bezel frame 21 or affixed thereto just above an opening in the bezel frame 21 for admitting the hinged portion of the door 13 sides of which hole are identified by the number 211 in FIG. 4. The hinge-pin portions 133 and 134 of the sides 131 and 132 of the door 13 are formed and arranged respective to each other to provide a hole through the hinge pin so that loudspeaker connection wires 680–683 that connect from the left audio amplifier circuitry 68 to the loudspeakers 14–16 can be threaded into the left door 13. The hinge pin formed from the hinge-pin portions 133 and 134 of the sides 131 and 132 is basically circularly cylindrical, but has a flat 135 on its end portion. A metal sleeve 136 fits tightly over the hinge-pin portions 133 and 134 of the sides 131 and 132 to strengthen the hinge pin in view of it being made hollow, which metal sleeve 136 aids in keeping the sides 131 and 132 of the door 13 together. Designs are possible in which the sides 131 and 132 of the door 13 slip one into the other and are held in place by metal sleeves over the hinge pins, without need for the screws 130. The metal sleeves such as 136 can be cemented to the hinge-pin portions they contain using an adhesive cement, rather than relying on force fit alone. The flat on the metal sleeve 136 has the unfettered end of a compression spring 212 pressed thereagainst when the door 13 is fully open to resist in measured degree the door 13 being closed; the fettered end of this spring 212 is riveted to the left side of the bezel frame 21 by rivets 213 and 214. The left-door interlock switch 48 of FIG. 3 is shown in FIG. 4 as a microswitch 480 affixed to the compression spring 212 (e.g., by epoxy cement). When the compression spring 212 presses against the flat on the metal sleeve 136, the lever arm 481 of the microswitch 480 is in its relaxed position; and the microswitch 480 provide a conductive connection between the wires 482 and 483. When the compression spring 212 presses against the rounded surface of the metal sleeve 136, the lever arm 481 of the microswitch 480 is forced from its relaxed position; and the microswitch 480 discontinues the conductive connection between the wires 482 and 483 until the compression spring 212 next again presses against the flat on the metal sleeve 136.

While the simple doors 13 and 17 shown in FIG. 1 are preferred for their simplicity and ease of achieving a rugged construction, designs in which the left and right loudspeakers are located further apart can provide better stereophonic sound separation.

FIG. 5 shows a modification of the left door 13 in which the sides 131 and 132 of the door are replaced by sides 1310 and 1320 that form a case for a further sliding door portion 1370 that can be pulled out to extend the positions of the loudspeakers 14—16 further from the cabinet 10. The modified left door of FIG. 5 is used with a similar modification of the right door 17.

FIG. 6 shows a modification of the left door 13 in which the sides 131 and 132 of the door are replaced by sides 1311 and 1321 of a first panel of the left door that form a case for an unfolding second panel 1371 of the left door that swings out on pivots 1372 to extend the positions of the loudspeakers 14—16 further from the cabinet 10. One or both of the pivots 1372 can be provided with holes for threading speaker connection wires therethrough. The second panel 1371 of the left door will fold with the first panel thereof, and the folded combination will close over the left half of the display screen 12. The modified left door of FIG. 6 is used with a similar modification of the right door 17 that has first and second panels, designed so the second panel can fold with the first panel and the folded combination can then close over the right half of the display screen 12.

Figure 7:
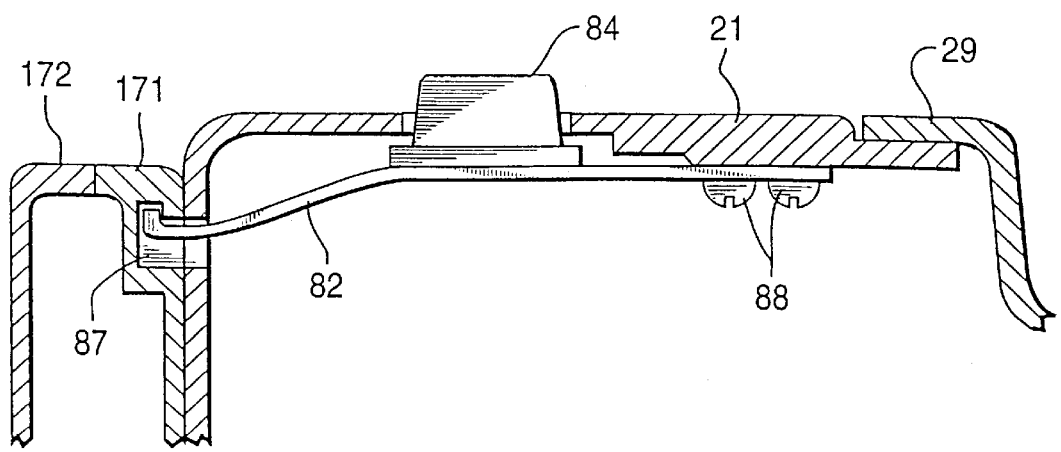
FIG. 7 is a sectional view of a latch mechanism for the doors of the FIG. 1 child-transportable television receiver.

FIG. 7 is a sectional view of the latch mechanism for the doors of the FIG. 1 child-transportable television receiver, with the right sides of the bezel frame 21 and the rear shell 29 being cut away, as well as portions of the closed right door 17. The section is through the edge of the closed right door 17 nearest the closed left door 13, which is hidden from view. The door 17 has an interior side 171 and an exterior side 172 formed as separate plastic moldings and joined together. The slot 87 at the top of the interior surface of the interior side 171 of the closed door 17 is shown in this sectional view. The spring catch 82 and the push button 84 are not cut away in FIG. 7, the section being presumed to be at the end of the slot 87. The spring catch 82 can be formed from a springy plastic or from spring metal. The fettered end of the spring catch 82 can be secured to the interior surface of the bezel frame 21 using an epoxy cement and self-tapping screws 88 threaded through clearance holes in the spring catch 82 and screwed into blind under-size holes running into the bezel frame 21 from its interior surface. The unfettered end of the spring catch 82 is hooked, and that hooked end settles up into the slots 83 and 87 in the interior surfaces of the closed doors 13 and 17 so as to engage grooves behind those interior surfaces. Depressing the push button 84 bends the spring catch 82 and disengages its hooked end from those grooves, permitting the compression springs 85 and 86 (shown in FIG. 1, but not in FIG. 7) to spring the doors 13 and 17 open.

Figure 8:
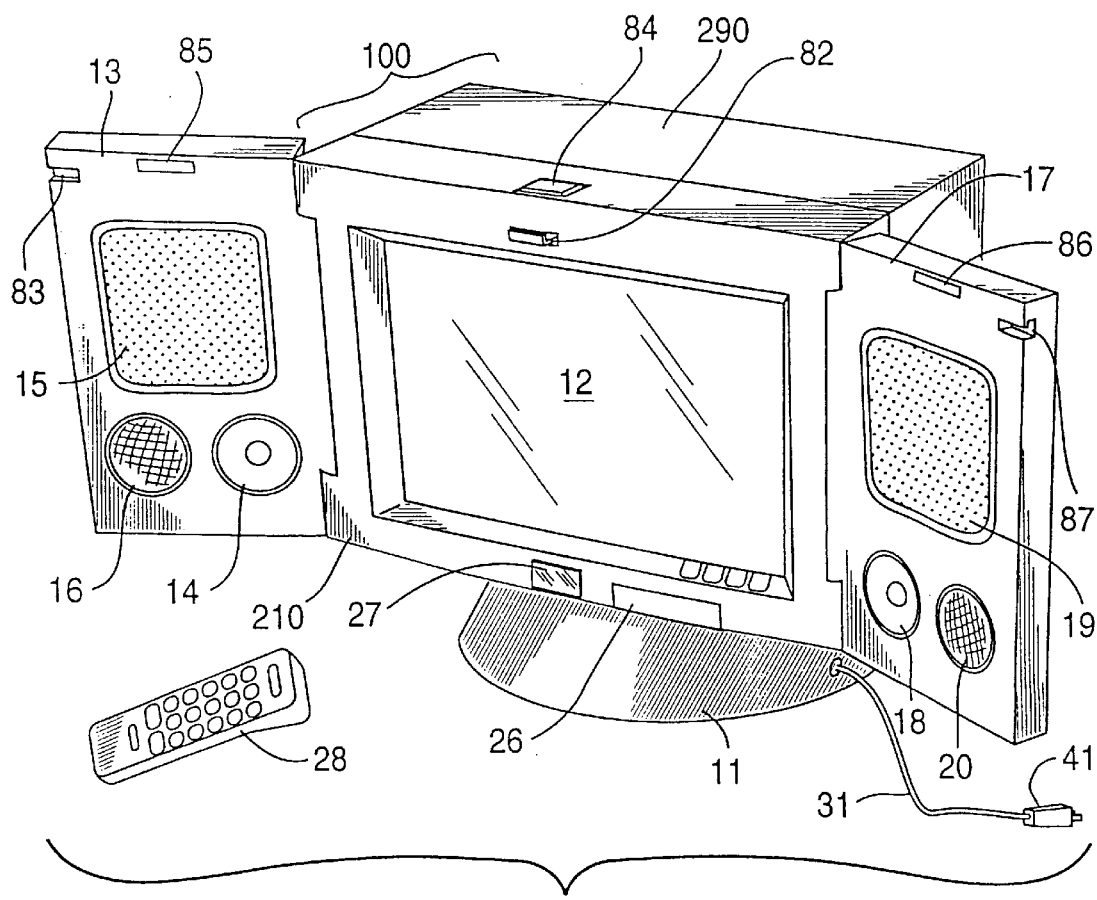
FIG. 8 is a front perspective view of a child-transportable television receiver embodying the invention, having doors that cover the display screen of its liquid crystal color display device during transport, and having stereophonic loudspeakers mounted in the doors, which open to the left and to the right of the display screen.

FIG. 8 is a front perspective view of a child-transportable television receiver embodying the invention, which uses a liquid crystal color display device rather than a kinescope, has doors 13 and 17 that cover the color display device 120 during transport, and has stereophonic loudspeakers 14—16 and 18–20 mounted in the doors 13 and 17, which open to the left and to the right of the display device 120. The cabinet 100 of the FIG. 8 television receiver is more box-like than the cabinet 10 of the FIG. 1 television receiver; and, since there is no need to accommodate a kinescope neck, the cabinet 100 can be constructed with a shorter front-to-back measurement for given screen size. The bezel frame 210 can be flatter than the bezel frame 21 of the FIG. 1 television receiver, but the bezel frame 210 is still used to provide room for domes on the loudspeakers 15 and 19 to swing into. The rear shell 290 is more rectangular in its general shape than the rear shell 29 of the FIG. 1 television receiver and shorter front-to-back, but the features on the back of the rear shell 290 are similar to those on the back of the rear shell 29. The electronics of the FIG. 8 television receiver are conventional for a television receiver using a liquid crystal color display device. While the costs for producing appreciable-diagonal-size (25 cm. or more) liquid crystal display devices are currently very high, prices are likely to come down in the near future. Furthermore, the higher price of the liquid crystal display devices provides further justification for the use of doors to protect the display screen.

Embodiments of the invention within child-transportable personal computers or monitors for them, rather than embodiments of the invention within television receivers, differ in regard to the electronics for driving the display and in regard to the resolution provided in the display device. The computer will have different connections to peripheral apparatus. Rather than an infrared remote control unit, the peripheral apparatus will include a keyboard and usually one or more of the following: a mouse, a joy-stick controller and a light pen. Rather than connections being provided for connecting to a VCR and cable or antenna, connections are provided for connecting to a modem and to a printer. These differences are well understood by electronics designers. The design of the cabinet to have a substantially vertical display screen, the use of left- and right-swinging doors over the display screen and the inclusion of stereophonic loudspeakers in the doors characterize child-transportable personal computers, or monitors for them, that embody the invention.

FIGS. 9–13 relate to a still further embodiment of the television receiver embodying the present invention, having doors that cover the display screen of its color kinescope, and having loudspeakers mounted in the doors, which open to the left and to the right of the display screen. The television receiver according to this further embodiment likewise may be child-transportable.

The cabinet 310 is shown as being mounted on a swivel-and-tilt stand 311. In the present embodiment, the stand 311 is removable such that the television receiver may be placed directly on a support surface by means of a pair of feet 345 located at the bottom of the cabinet near the front thereof, and a flange 346 located on the bottom near the back of the cabinet 310 (see FIG. 13).

Figure 10:
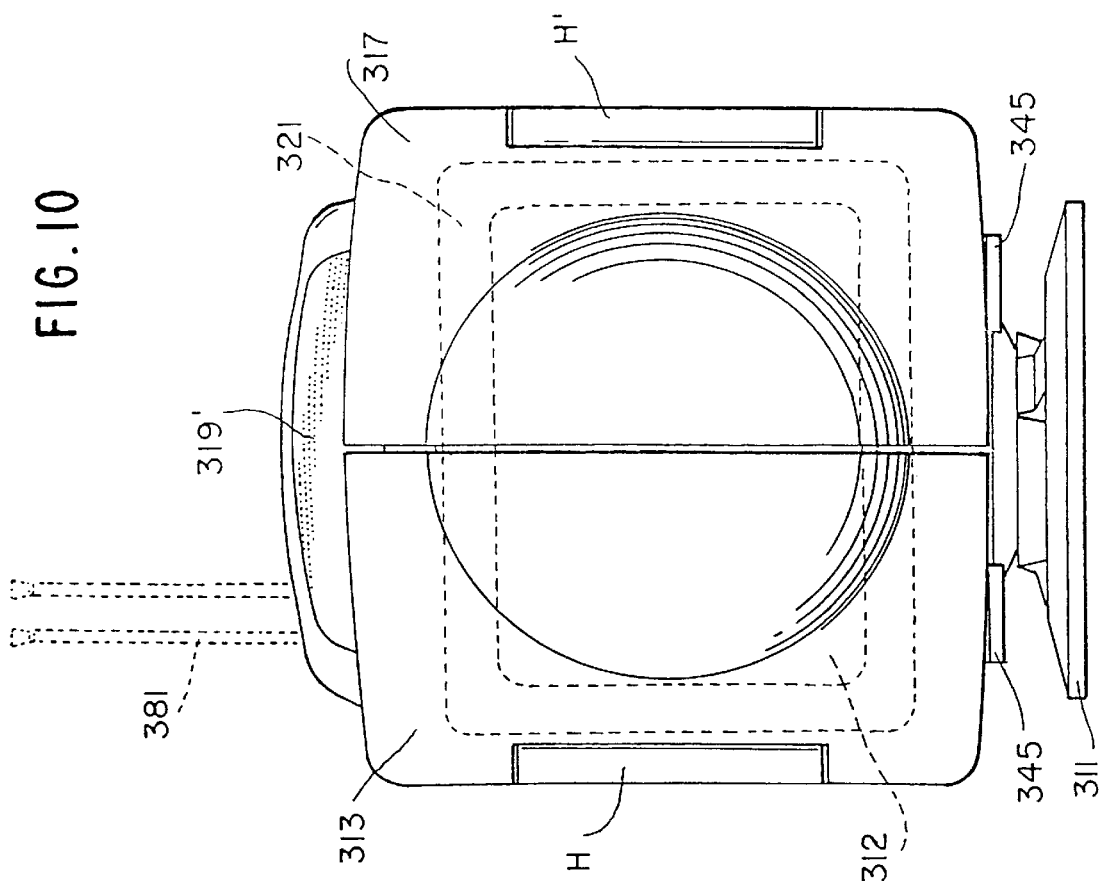
FIG. 10 is a front elevational view of the embodiment of FIG. 9 with the left and right doors closed.
Figure 11:
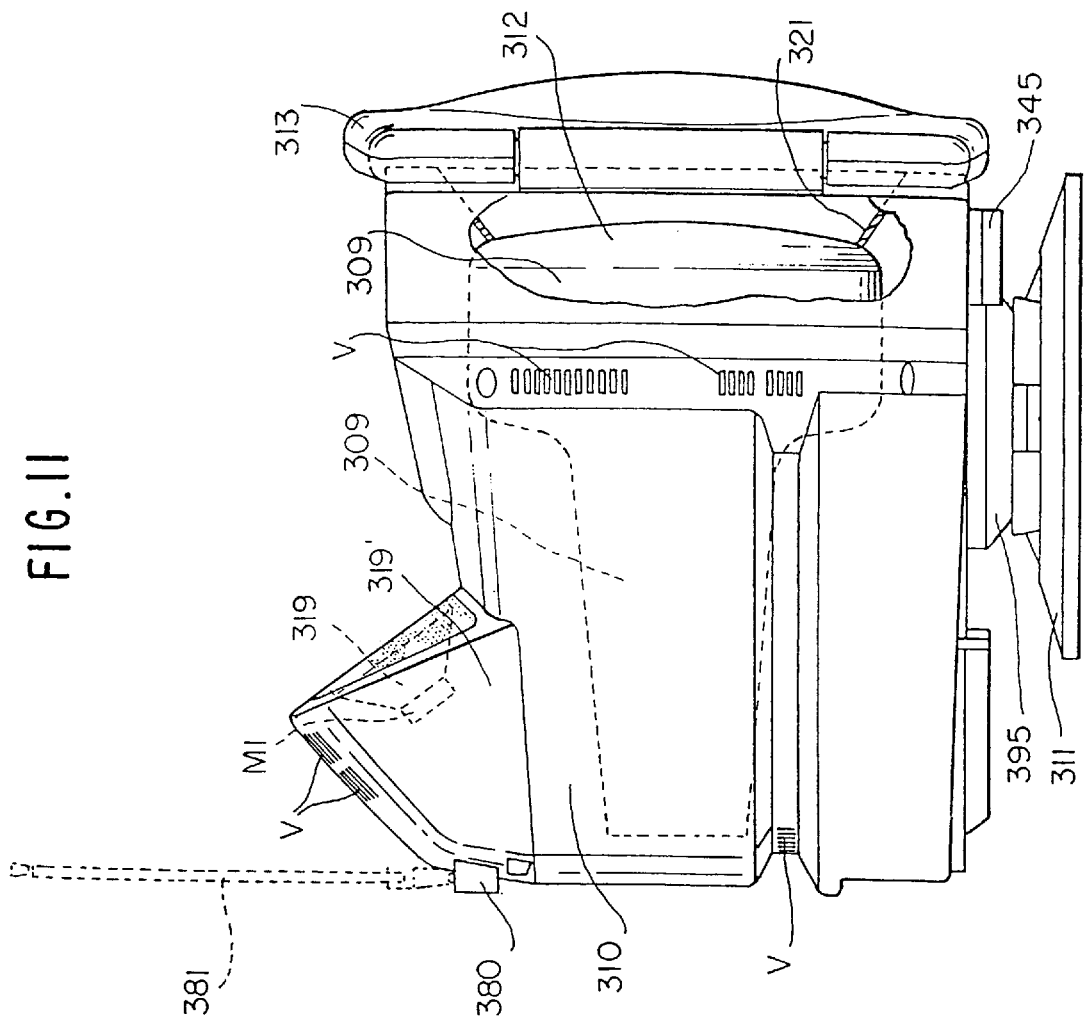
FIG. 11 is a side elevational view of the embodiment of FIG. 9.

A front side of the cabinet 310 has a display screen 312 of a display device such as a kinescope as described above with respect to the embodiment of FIG. 1, disposed therewithin. As best shown in FIG. 11, the kinescope 309 has a substantial depth, owing to its neck extending back from its display screen 312, so that the cabinet 310 in turn has a complementary depth. In the television receiver of FIGS. 9–13, a tweeter 314 and a mid-frequency-range speaker 316 are located in the left door 313, and a tweeter 318 and a mid-frequency-range speaker 320 are located in the right door 317. While the left door 313 and the right door 317 each include loudspeakers therein for stereophonic reproduction in the mid-range and upper-range frequencies, a single woofer speaker 319 is mounted on the top of the cabinet 310 and positioned near the back of the cabinet 310 to provide mixed lower-range frequencies. The permanent magnet in the drive motor of the woofer loudspeaker 319 tends to be larger than that in the drive motors of the other loudspeakers, and positioning of the woofer loudspeaker 319 on the top near the back of the cabinet 310 keeps the permanent magnet M1 in its drive motor further from the color kinescope, to avoid distorting the magnetic conditions near the faceplate of the color kinescope on which faceplate the display screen 312 is disposed. As best shown in FIG. 11, the woofer speaker 319 is disposed within a speaker housing 319' at a front-facing, upwardly directed angle to ensure that maximum sound quality is obtained.

Figure 9:
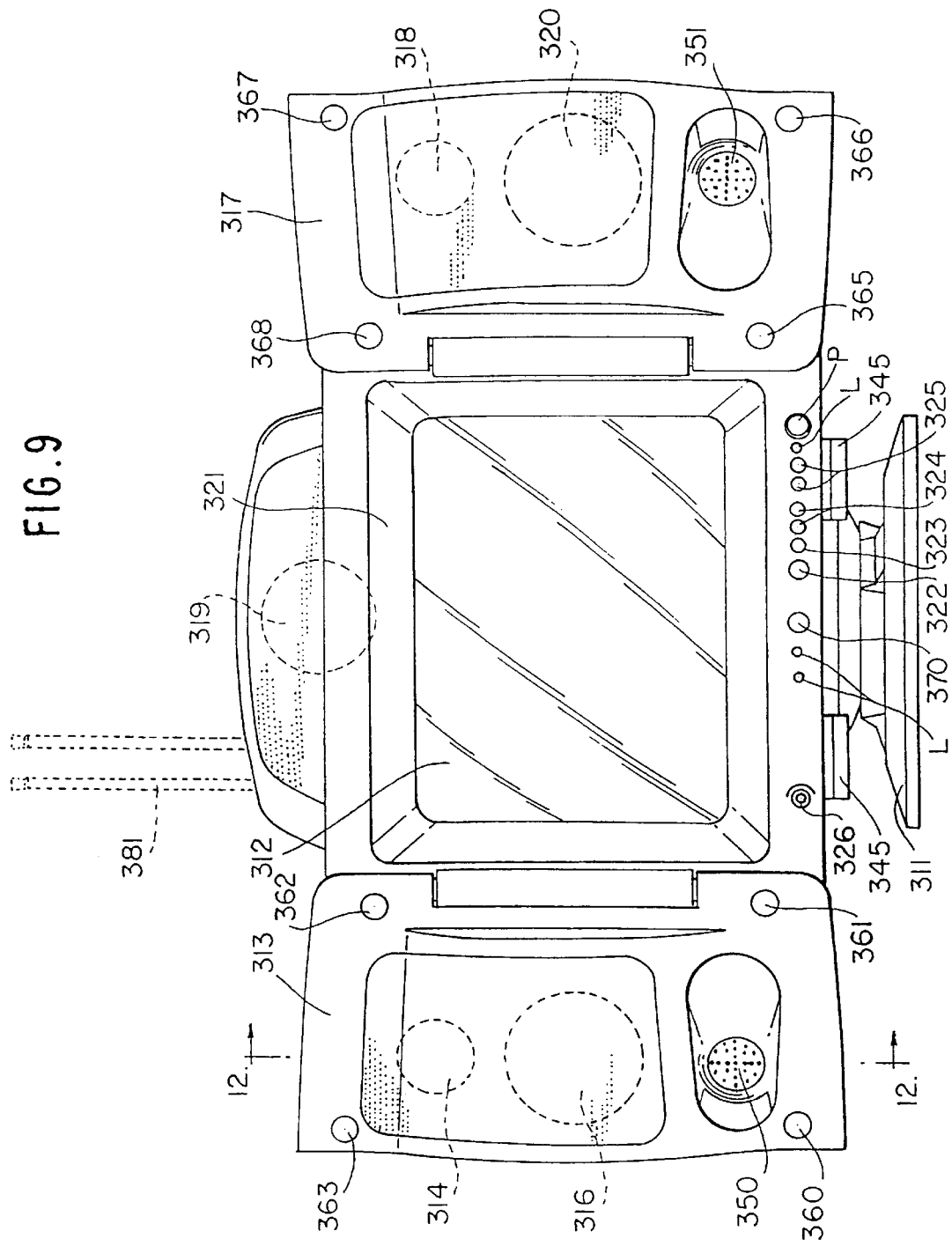
FIG. 9 is a front elevational view of the television receiver according to a still further embodiment showing the left and right doors with loudspeakers mounted therein in an open position.
Figure 12:
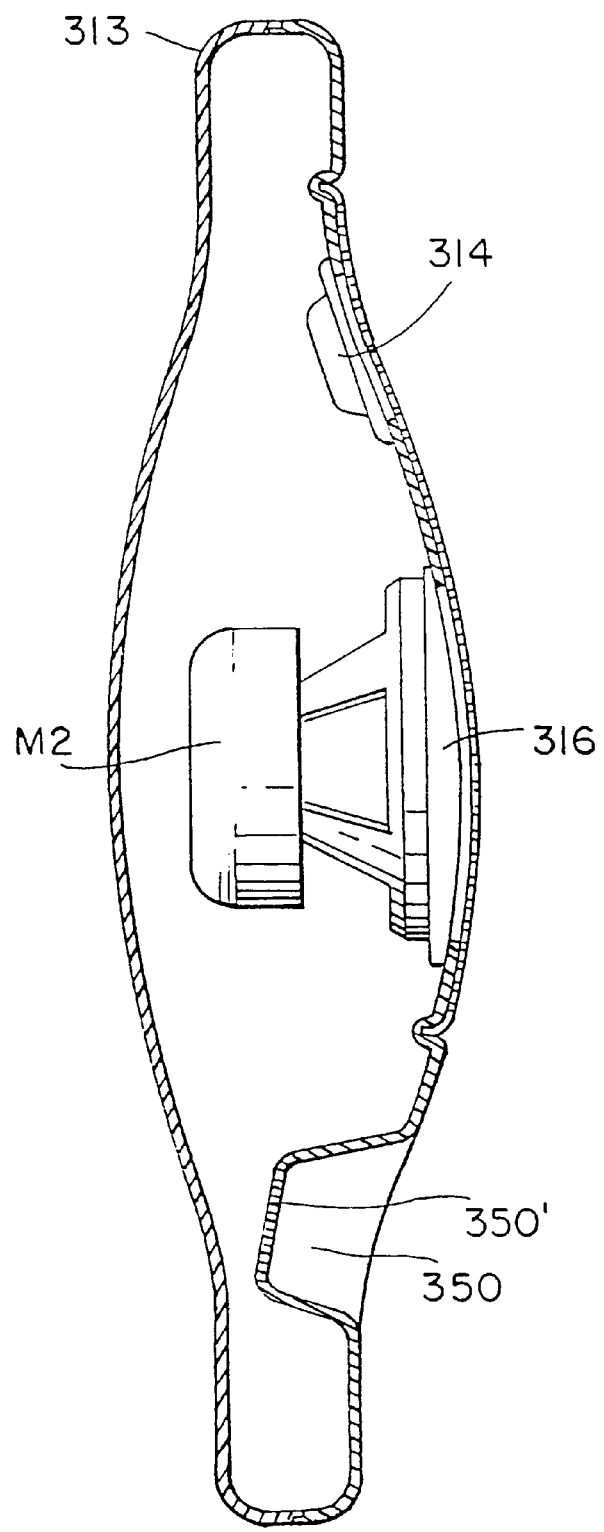
FIG. 12 is a cross-sectional view taken along the line 12—12 in FIG. 9.
Figure 13:
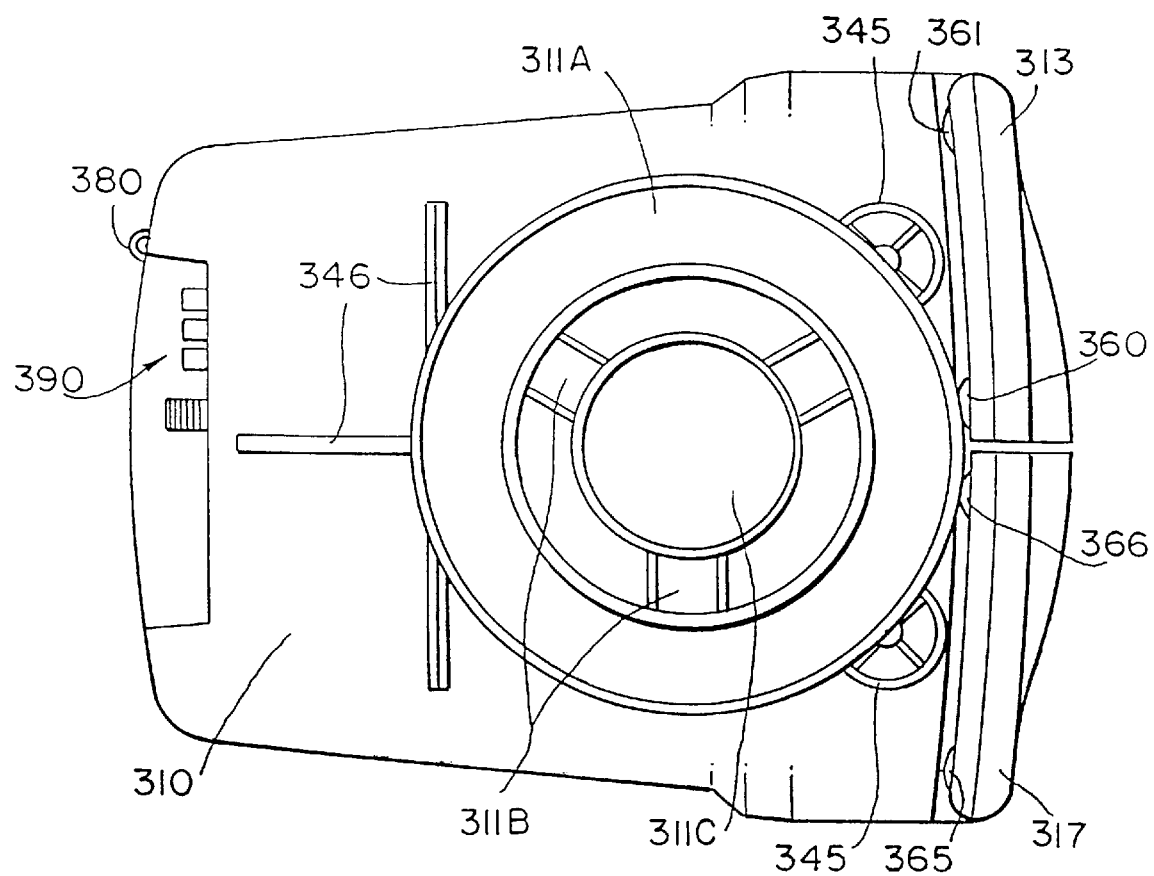
FIG. 13 is a bottom view of the embodiment of FIG. 9.

The left and right doors 313 and 317 are formed to provide acoustical conduits conditioning the loudspeakers 316 and 320 for reflex operation, improving their acoustic efficiency so as to allow the permanent magnets in their respective drive motors to be smaller and of less strength. This helps avoid these permanent magnets causing the color kinescope to exhibit color purity problems. More specifically, the left and right doors 313 and 317 are formed with acoustic ports 350 and 351 shown in FIG. 9 as being near the bases of the respective doors below the loudspeakers in those doors. Alternatively, the acoustic ports 350 and 351 might be located near the tops of the doors above the loudspeakers in those doors. The acoustic ports 350, 351 are each formed as a generally horn-shaped oblong recess with a salt-shaker opening, as best shown in FIGS. 9 and 12. FIG. 12 is a cross-section view of the door 313, showing the recessed location of the salt-shaker opening 350' of the acoustic port 350 in the door 313 and showing the permanent magnet M2 of the drive motor of the loudspeaker 316. Each of the left and right doors 313 and 317 bulges outwardly at the front face and rear face thereof as best shown in FIGS. 9, 11 and 12. The bulging shape not only accommodates the tweeter and mid-range speakers, but also implements internally redirection of the sound from the backs of the cones of the loudspeakers 316 and 320 to the fronts of the doors 313 and 317 when opened to their spread position. With such an arrangement, the air movements from the backs of the cones of the loudspeakers 316 and 320 are channeled around to the acoustic ports 350, 351, respectively, to exit at phasings that reinforce the direct sound radiation from the fronts of the cones of the loudspeakers 316 and 320, respectively. This phenomenon is known as "reflexing". Since the doors 313 and 317 do not have bass or woofer loudspeakers mounted therein, the acoustic ports 350 and 351 provide for the loudspeakers 316 and 320 being operated as mid-frequency-range reflex speakers.

In an alternative, still further embodiment of the invention, differing from that shown in FIGS. 9–13 in that no tweeters 314, 318 are used, the loudspeakers 316, 320 are upper-frequency-range loudspeakers. The acoustical conduits through the doors 313 and 317 and the acoustic ports 350 and 351 provide for the loudspeakers 316 and 320 being operated as upper-frequency-range reflex speakers in this alternative embodiment.

Similar to the embodiment shown in FIGS. 1–4 and FIG. 7, the left and right doors 313 and 317 are respectively hinged to the cabinet 310. Preferably, the hinges H and H' permit the left and right doors 313 and 317, respectively, to be opened up so that the front faces are generally parallel to the front face of the cabinet 310, while preventing further backward rotation of the doors beyond this position toward the cabinet 310. Moreover, the hinges allow the doors to be easily opened by the user, but at the same time prevent the doors from easily flying open during transport. When the left and right doors 313 and 317 are in the closed position as best shown in FIG. 10, the doors serve to protect the display screen 312 from possible damage during transport, as well as affording protection to the user during transport, especially a child having the display screen side near the stomach.

As best shown in FIG. 9, the left door 313 has four bosses 360, 361, 362 and 363 generally located in the corner areas of the door on the front face. The right door 317 likewise has four bosses 365, 366, 367 and 368 similarly located as the bosses 360–363 in the left door 313. The bosses 360–363 and 365–368 may take the form of rubber members which are fitted into recesses formed in the door, which recesses may allow access to fasteners (not shown) for holding structural members of each of the door 313 and 317 together. For example, the heads of self-tapping screws are accessed through such recesses in embodiments of the invention scheduled for mass manufacturing. The bosses prevent the outer face of the bezel frame 321, as well as the inner surface of the left and right doors 313 and 317, from being scratched when the doors are closed. Just as importantly, the bosses keep the doors spaced the proper distance from the outer face of the bezel frame 321 so that the doors do not inadvertently contact any of the principal television set control buttons, which will be described in more detail below.

Bezel frame 321 is of a deep-bezel construction in the embodiment shown in FIGS. 9–13. The depth of the bezel is preferably, but not necessarily, approximately 5 cm. Accordingly, when the left and right doors 313 and 317 are closed, the mounting of the tweeter 314, 318 and mid-range 316, 320 loudspeakers within the left and right doors and the deep bezel frame recessing of the face of the display screen 312 from the front side of the cabinet 310 are dimensioned to keep any permanent magnets of the above loudspeakers a few centimeters away from the face of the display screen 312 so no appreciable lost of color purity is apparent when the left and right doors 313 and 317 are opened, resulting from the proximity of the loudspeaker permanent magnets to the face of the display screen 312 of the kinescope when the left and right doors 313 and 317 have been closed.

In contrast to the embodiment shown in FIG. 1, in the embodiment shown in FIGS. 9–13 the principal television set controls are located on the front face of the bezel frame 321, rather than within the opening of the bezel frame. Television set controls may include push buttons 322 for GX mode, 323 for menu, 324 for increasing and decreasing the volume, 325 for changing the channel, and P for turning on and off the power. Moreover, the front face of the bezel frame 321 may include indicator lights L for indicating, for example, when the power is on, whether the woofer is on, and whether a surround sound function is activated. A head phone jack 326 also may be positioned in the front face of the bezel frame 321 for permitting the user to plug in standard headphones. As in the embodiment of FIG. 1, an infrared sensor 370 for receiving remote control signals from an infrared remote control (similar to remote control 28 shown in FIG. 1) is also located on the front of the bezel frame 321.

At the rear of the television receiver, the cabinet 310 may be formed with an extension 380 having a socket for plugging in rabbit ears 381. When the television receiver is to be used by a child, a parent can easily remove the rabbit ears 381 to avoid any danger they may pose to the child when the receiver is placed on the floor. The standard audio/video jacks and related inputs and outputs are shown schematically in FIG. 13, being denoted generally with the reference numeral 390.

The cabinet 310 of the television receiver shown in FIGS. 9–13 includes ventilation openings V to permit heat generated within the receiver to escape. See FIG. 11 in particular, in regard to this detail.

With respect to the television circuitry, reference is made to FIG. 3 of the previous embodiment for the particulars of suitable circuitry. A suitable power cord and plug (not shown) are also included.

As noted above, the supporting base 311 is designed to permit the cabinet 310 to be both swiveled and tilted on the supporting base 311. As shown in FIGS. 9–11 and 13, the supporting base 311 is formed by annular base 311A and a plurality of radial spokes 311B extending inwardly to a central hub member 311C. The central hub member 311C has a saucer-shaped upper surface for movably receiving a dome-shaped member 395 (see FIG. 11) which in turn is detachably mounted to the television cabinet 310. In addition to adjusting the viewing direction, the swivel-and-tilt aspect of the supporting base 311 permits the loudspeakers located in the left and right doors 313 and 317 to be suitably directed so that stereophonic sound is radiated toward the most desirable location for the user without having to slide the supporting base 311 on the surface on which it is placed, the attendant movement of the woofer speaker 319 being acceptable insofar as stereophonic sound reproduction is concerned. Such a feature is beneficial in a situation where a stereophonic sound reproduction apparatus with stereophonic loudspeakers mounted in its doors, such as one of the television receivers or computer monitors described herein, is placed on a surface having a fine wood finish or the like, which surface susceptible to the problem of scratching when the stereophonic sound reproduction apparatus is slid thereacross.

Figure 14:
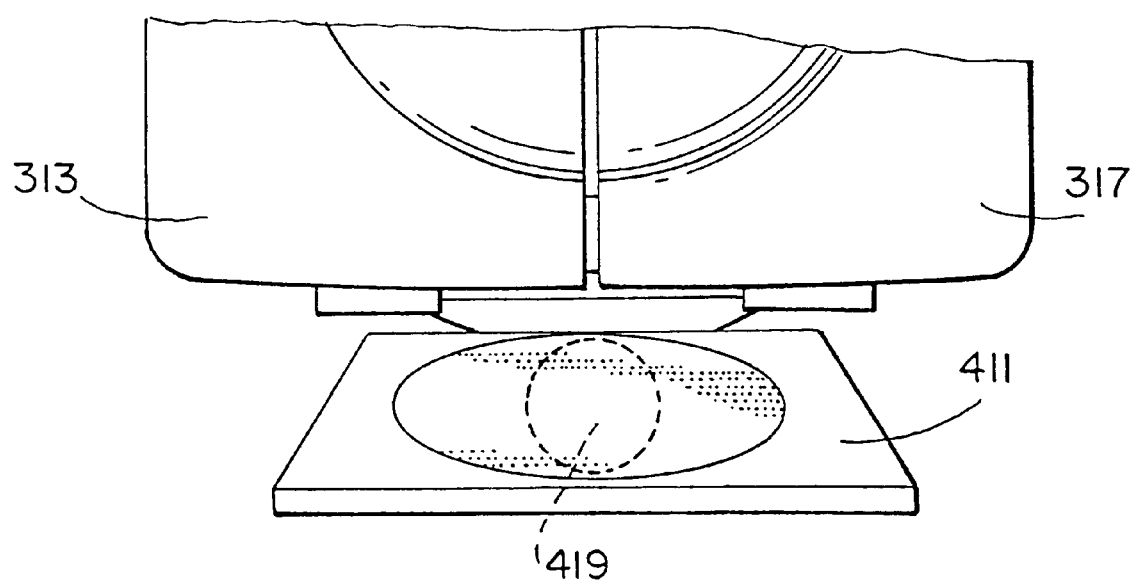
FIG. 14 is a schematic illustration of yet another embodiment of the present invention.

While the further embodiment of FIGS. 9–13 shows the woofer 319 positioned in the top rear portion of the cabinet 310, alternatively, a woofer 419 may be positioned in a modified base member 411 as shown in FIG. 14. Of course, suitable wiring is provided between the woofer 419 and the television receiver. Alternatively, the woofer 419 positioned in the base member 411 can take the form of a horn drive directed downward toward the surface supporting the modified base member 411.

Console or hutch types of cabinets for television receivers which employ left- and right-swinging doors that can close over the display screen and include stereophonic loudspeakers in the doors, which loudspeakers flank the display screen when the doors are opened to a spread position, are contemplated as further embodiments of the invention. Portable television receivers which are too large or heavy to be child-transportable, but which employ left- and right-swinging doors that can close over the display screen and include stereophonic loudspeakers in the doors, which loudspeakers flank the display screen when the doors are opened to a spread position, are also contemplated as embodiments of the invention.

In the claims which follow, the phrase "a child-transportable portable television receiver or computer monitor" is to be construed as being descriptive of a general class of devices, which general class includes child-transportable portable television receivers, which general class includes child-transportable computer monitor, and which general class includes devices having combined capabilities of being used as a television receiver and being used as a computer monitor.

What is claimed is:

1. A television receiver or computer monitor comprising:
a television display device with a display screen;
a cabinet enclosing said television display device so as to leave its said display screen exposed to view at a front side of said cabinet, said display screen is substantially vertical as normally viewed and has left-hand and right-hand sides as viewed from said front side of said cabinet, said cabinet having a left-hand side and a right-hand side in addition to its said front side;
television receiver circuitry enclosed within said cabinet together with said television display device, said television receiver circuitry including
a receiver for receiving radio-frequency carrier waves modulated with video and audio portions of a television signal and supplying demodulated video and audio signals in response thereto, said television receiver circuitry including
video circuitry responsive to said demodulated video signal for supplying electrical signals to said television display device as will cause images to appear on said display screen, and television receiver circuitry including
audio circuitry responsive to said demodulated audio signal for supplying left and right sound-descriptive signals;
a left door hinged from said cabinet for covering the left-hand side of said display screen when closed and for extending from the left-hand side of said cabinet when opened;
a right door hinged from said cabinet for covering the right-hand side of said display screen when closed and for extending from the right-hand side of said cabinet when opened;
a left loudspeaker mounted within said left door and driven by said left sound-descriptive signal; and
a right loudspeaker mounted within said right door and driven by said right sound-descriptive signal, said left and right loudspeakers flanking said display screen when said left and right doors are opened to a spread position.

2. A television receiver or computer monitor as set forth in claim 1 which is of a portable type.

3. A television receiver or computer monitor as set forth in claim 2 which is a child-transportable portable television receiver or computer monitor, said cabinet enclosing said television display device except for its said display screen.

4. A television receiver or computer monitor as set forth in claim 1, wherein said left loudspeaker has a fixed mounting within said left door, and wherein said right loudspeaker has a fixed mounting within said right door.

5. A television receiver or computer monitor as set forth in claim 1, wherein said cabinet enclosing said television display device or computer monitor except for its said display screen is mounted on a swivel-and-tilt stand.

6. A television receiver or computer monitor as set forth in claim 1, wherein said receiver for receiving radio-frequency carrier waves includes a tuner for receiving television signals re-transmitted on a 920 MHz carrier.

7. A television receiver or computer monitor as set forth in claim 6, wherein said tuner for receiving television signals re-transmitted on a 920 MHz carrier receives said re-transmitted television signals from an interior antenna located within said cabinet.

8. A television receiver or computer monitor comprising:
a color kinescope having a display screen including a pattern of different color phosphors;
video circuitry for supplying electrical signals to said kinescope as will cause images to appear on said display screen;
audio circuitry for supplying left and right sound-descriptive signals;
a cabinet enclosing said kinescope so as to leave its said display screen exposed to view at a front side of said cabinet, which said display screen is substantially vertical as normally viewed and has left-hand and right-hand sides as viewed from said front side of said cabinet, said cabinet having a left-hand side and a right-hand side in addition to its said front side;
a left door hinged from said cabinet for covering the left-hand side of said display screen when closed and for extending from the left-hand side is of said cabinet when opened;
a right door hinged from said cabinet for covering the right-hand side of said display screen when closed and for extending from the right-hand side of said cabinet when opened;
a left loudspeaker mounted within said left door and driven by said left sound-descriptive signal; and
a right loudspeaker mounted within said right door and driven by said right sound-descriptive signal, said left and right loudspeakers flanking said display screen when said left and right doors are opened to a spread position and having electromagnetic motors with elements therewithin that are or are likely to be permanently magnetized;
a set of degaussing coils at the perimeter of said display screen; and
circuitry for supplying de-gaussing current to said degaussing coils for a time immediately after the following conditions simultaneously obtain: (a) said television receiver or computer monitor is supplied power, (b) said right door is fully open or substantially so, and (c) said left door is fully open or substantially so.

9. A television receiver or computer monitor as set forth in claim 8 which is of a portable type.

10. A television receiver or computer monitor as set forth in claim 9 which is a child-transportable portable television receiver or computer monitor, said cabinet enclosing said kinescope except for its said display screen.

11. A television receiver or computer monitor as set forth in claim 8, further comprising:
circuitry for supplying power to said television receiver or computer monitor only when said right door is fully open or substantially so at the same time said left door is fully open or substantially so.

12. A television receiver or computer monitor comprising:
a television display device with a display screen the color purity of which is unaffected by local magnetic fields near its display screen;
video circuitry for supplying electrical signals to said television display device as will cause images to appear on said display screen;
audio circuitry for supplying left and right sound-descriptive signals;
a cabinet enclosing said television display device so as to leave its said display screen exposed to view at a front side of said cabinet, which said display screen is substantially vertical as normally viewed and has left-hand and right-hand sides as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal, said left and right loudspeakers flanking said display screen when said left and right doors are opened to a spread position and having electromagnetic motors with elements therewithin that are or are likely to be permanently magnetized.

13. A television receiver or computer monitor as set forth in claim 12 which is of a portable type.

14. A television receiver or computer monitor as set forth in claim 13 which is a child-transportable portable television receiver or computer monitor, said cabinet enclosing said television display device except for its said display screen.

15. A television receiver or computer monitor as set forth in claim 12 wherein said television display device is a liquid crystal color display device.

16. A television receiver or computer monitor comprising:

a color kinescope having a display screen;

video circuitry for supplying electrical signals to said kinescope as will cause images to appear on said display screen;

audio circuitry for supplying left and right sound-descriptive signals;

a cabinet enclosing said kinescope so as to leave its said display screen exposed to view at a front side of said cabinet, which said display screen is substantially vertical as normally viewed and has left-hand and right-hand sides as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and driven by said left sound-descriptive signal; and a right loudspeaker mounted within said right door and driven by said right sound-descriptive signal, said left and right loudspeakers flanking said display screen when said left and right doors are opened to a spread position, wherein said left and right loudspeakers are constructed so as not to have permanently magnetized elements therewithin.

17. A television receiver or computer monitor as set forth in claim 16 which is of a portable type.

18. A television receiver or computer monitor as set forth in claim 17 which is a child-transportable portable television receiver or computer monitor, said cabinet enclosing said kinescope except for its said display screen.

19. A television receiver or computer monitor comprising:

a television display device with a display screen;

video circuitry for supplying electrical signals to said television display device as will cause images to appear on said display screen;

audio circuitry for supplying left and right sound-descriptive signals;

a cabinet enclosing said television display device so as to leave its said display screen exposed to view at a front side of said cabinet, which said display screen is substantially vertical as normally viewed and has left-hand and right-hand sides as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened, said left door having a first sliding member therewithin, which first sliding member can be extended from a side of said left door opposite from a side of said left door hinged to said cabinet;

a right door hinged from said cabinet for covering the right-hand side of said display screen when closed and for extending from the right-hand side of said cabinet when opened, said right door having a second sliding member therewithin, which second sliding member can be extended from a side of said right door opposite from a side of said right door hinged to said cabinet;

a left loudspeaker having a fixed mounting to said first sliding member within said left door and driven by said left sound-descriptive signal; and a right loudspeaker having a fixed mounting to said second sliding member within said right door and driven by said right sound-descriptive signal, said left and right loudspeakers flanking said display screen when said left and right doors are opened to a spread position.

20. A television receiver or computer monitor as set forth in claim 19 which is of a portable type.

21. A television receiver or computer monitor as set forth in claim 20 which is a child-transportable portable television receiver or computer monitor, said cabinet enclosing said television display device except for its said display screen.

22. A television receiver or computer monitor comprising:

a television display device with a display screen;

video circuitry for supplying electrical signals to said television display device as will cause images to appear on said display screen;

audio circuitry for supplying left and right sound-descriptive signals;

a cabinet enclosing said television display device so as to leave its said display screen exposed to view at a front side of said cabinet, which said display screen is substantially vertical as normally viewed and has left-hand and right-hand sides as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened, said left door having respective first and second panels that can fold together to form a first folded combination that can close over the left half of said display screen, the first panel of said left door being hinged on a first side thereof to said cabinet near the left side of said display screen and being hinged on a second side thereof to a first side of the second panel of said left door;

a left loudspeaker having a fixed mounting to the second panel of said left door so as to be enfolded within said first folded combination, and being driven by said left sound-descriptive signal;

a right door hinged from said cabinet for covering the right-hand side of said display screen when closed and for extending from the right-hand side of said cabinet when opened, said right door having respective first and second panels that can fold together to form a second folded combination that can close over the right half of said display screen, the first panel of said right door being hinged on a first side thereof to said cabinet near the right side of said display screen and being hinged on a second side thereof to a first side of the second panel of said right door; and a right loudspeaker having a fixed mounting to the second panel of said right door so as to be enfolded within said second folded combination, and being driven by said right sound-descriptive signal, said left and right loudspeakers flanking said display screen when said left and right doors are opened to a spread position.

23. A television receiver or computer monitor as set forth in claim 22 which is of a portable type.

24. A television receiver or computer monitor as set forth in claim 23 which is a child-transportable portable television receiver or computer monitor, said cabinet enclosing said television display device except for its said display screen.

25. A television receiver or computer monitor comprising:
a television display device with a display screen;
video circuitry for supplying electrical signals to said television display device as will cause images to appear on said display screen;
audio circuitry for supplying left and right sound-descriptive signals;
a cabinet enclosing said television display so as to leave its said display screen exposed to view at a front side of said cabinet, which said display screen is substantially vertical as normally viewed and has left-hand and right-hand sides as viewed from said front side of said cabinet, said cabinet having a left-hand side and a right-hand side in addition to its said front side;
a stand on which said cabinet enclosing said television display device except for its said display screen is mounted, said stand encasing a spring cord winder for the power cord of said television receiver or computer monitor;
a left door hinged from said cabinet for covering the left-hand side of said display screen when closed and for extending from the left-band side of said cabinet when opened;
a right door hinged from said cabinet for covering the right-hand side of said display screen when closed and for extending from the right-hand side of said cabinet when opened;
a left loudspeaker mounted within said left door and driven by said left sound-descriptive signal; and
a right loudspeaker mounted within said right door and driven by said right sound-descriptive signal, said left and right loudspeakers flanking said display screen when said left and right doors are opened to a spread position.

26. A television receiver or computer monitor as set forth in claim 25 which is of a portable type.

27. A television receiver or computer monitor as set forth in claim 26 which is a child-transportable portable television receiver or computer monitor, said cabinet enclosing said television display device except for its said display screen.

28. A television receiver or computer monitor as set forth in claim 25, wherein said stand is a tilt stand.

29. A television receiver or computer monitor as set forth in claim 25, wherein said stand is a swivel stand.

30. A television receiver or computer monitor as set forth in claim 25, wherein said stand is a swivel-and-tilt stand.

31. A television receiver as set forth in claim 25 including a tuner for receiving television signals re-transmitted on a 920 MHz carrier.

32. A television receiver or computer monitor as set forth in claim 31, wherein said tuner for receiving television signals re-transmitted on a 920 MHz carrier receives said re-transmitted television signals from an interior antenna located within said cabinet.

33. A television receiver or computer monitor comprising:
a color kinescope with a display screen having a face and being subject to loss of color purity because of change in magnetic field;
a bezel frame surrounding the face of said display screen for recessing the face of said display screen;
video circuitry for supplying electrical signals to said kinescope as will cause images to appear on said display screen;
audio circuitry for supplying left and right sound-descriptive signals;
a cabinet enclosing said kinescope so as to leave exposed to view the face of said display screen and the surrounding bezel frame, which said display screen is mounted with its face recessed from a front side of said cabinet, is substantially vertical as normally viewed, and has a left-hand side and a right-hand side as viewed from said front side of said cabinet, said cabinet having a left-hand side and a right-hand side in addition to its said front side;
a left door hinged from said cabinet for covering the left-hand side of said display screen when closed and for extending from the left-hand side of said cabinet when opened;
a right door hinged from said cabinet for covering the right-hand side of said display screen when closed and for extending from the right-hand side of said cabinet when opened;
a left loudspeaker mounted within said left door and provided with a first loudspeaker motor driven by said left sound-descriptive signal, which first loudspeaker motor includes a first permanent magnet; and
a right loudspeaker mounted within said right door and provided with a second loudspeaker motor driven by said right sound-descriptive signal, which second loudspeaker motor includes a second permanent magnet;
wherein, when said left and right doors are closed, the mounting of said loudspeakers within said left and right doors and said bezel frame recessing of the face of said display screen from the front side of said cabinet are dimensioned to keep said first and second permanent magnets a few centimeters away from the face of said display screen such that no appreciable loss of color purity because of change in magnetic field is apparent when said left and right doors are opened, resulting from the proximity of said first and second permanent magnets to the face of said display screen of said kinescope when said left and right doors have been closed.

34. A television receiver or computer monitor as set forth in claim 33 which is portable.

35. A television receiver or computer monitor as set forth in claim 34 which is child-transportable.

36. A television receiver or computer monitor as set forth in claim 33, further comprising a base for supporting said cabinet.

37. A television receiver or computer monitor as set forth in claim 36, wherein said cabinet can be swiveled on its said supporting base.

38. A television receiver or computer monitor as set forth in claim 36, wherein said cabinet can be tilted on its said supporting base.

39. A television receiver or computer monitor as set forth in claim 36, wherein said cabinet can be both swiveled and tilted on its said supporting base.

40. A television receiver or computer monitor comprising:

a color kinescope with a display screen having a face and being subject to loss of color purity because of change in magnetic field;

a bezel frame surrounding the face of said display screen for recessing the face of said display screen;

video circuitry for supplying electrical signals to said kinescope as will cause images to appear on said display screen;

audio circuitry for supplying left and right sound-descriptive signals in a frequency range above a prescribed frequency and for supplying a mixed-low sound-descriptive signal in a frequency range below said prescribed frequency;

a cabinet enclosing said kinescope so as to leave exposed to view the face of said display screen and the surrounding bezel frame, which said display screen is mounted with its face recessed from a front side of said cabinet, is substantially vertical as normally viewed, and has a left-hand side and a right-hand side as viewed from said front side of said cabinet, said cabinet having a left-hand side and a right-hand side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and provided with a first loudspeaker motor driven by said left sound-descriptive signal, which first loudspeaker motor includes a first permanent magnet;

a right loudspeaker mounted within said right door and provided with a second loudspeaker motor driven by said right sound-descriptive signal, which second loudspeaker motor includes a second permanent magnet; and a woofer loudspeaker mounted within said cabinet and provided with a third loudspeaker motor driven by said mixed-low sound-descriptive signal, which third loudspeaker motor includes a third permanent magnet of greater magnetic field strength than said first permanent magnet and of greater magnetic field strength than said second permanent magnet;

wherein, when said left and right doors are closed, the mounting of said loudspeakers within said left and right doors and said bezel frame recessing of the face of said display screen from the front side of said cabinet are dimensioned to keep said first and second permanent magnets a few centimeters away from the face of said display screen such that no appreciable loss of color purity because of change in magnetic field is apparent when said left and right doors are opened, resulting from the proximity of said first and second permanent magnets to the face of said display screen of said kinescope when said left and right doors have been closed.

41. A television receiver or computer monitor as set forth in claim 40 which is portable.

42. A television receiver or computer monitor as set forth in claim 41 which is child-transportable.

43. A television receiver or computer monitor as set forth in claim 40, further comprising a base for supporting said cabinet.

44. A television receiver or computer monitor as set forth in claim 43, wherein said cabinet can be swiveled on its said supporting base.

45. A television receiver or computer monitor as set forth in claim 43, wherein said cabinet can be tilted on its said supporting base.

46. A television receiver or computer monitor as set forth in claim 43, wherein said cabinet can be both swiveled and tilted on its said supporting base.

47. A television receiver or computer monitor comprising:

a color kinescope with a display screen having a face and being subject to loss of color purity because of change in magnetic field;

a bezel frame surrounding the face of said display screen for recessing the face of said display screen;

video circuitry for supplying electrical signals to said kinescope as will cause images to appear on said display screen;

audio circuitry for supplying left and right sound-descriptive signals in a frequency range above a prescribed frequency and for supplying a mixed-low sound-descriptive signal in a frequency range below said prescribed frequency;

a cabinet enclosing said kinescope so as to leave exposed to view the face of said display screen and the surrounding bezel frame, which said display screen is mounted with its face recessed from a front side of said cabinet, is substantially vertical as normally viewed, and has a left-hand side and a right-hand side as viewed from said front side of said cabinet, said cabinet having a left-hand side and a right-hand side in addition to its said front side;

a base for supporting said cabinet;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door and provided with a first loudspeaker motor driven by said left sound-descriptive signal, which first loudspeaker motor includes a first permanent magnet;

a right loudspeaker mounted within said right door and provided with a second loudspeaker motor driven by said right sound-descriptive signal, which second loudspeaker motor includes a second permanent magnet; and a woofer loudspeaker mounted within said base for said cabinet and provided with a third loudspeaker motor driven by said mixed-low sound-descriptive signal, which third loudspeaker motor includes a third permanent magnet of greater magnetic field strength than said first permanent magnet and of greater magnetic field strength than said second permanent magnet;

wherein, when said left and right doors are closed, the mounting of said loudspeakers within said left and right doors and said bezel frame recessing of the face of said display screen from the front side of said cabinet are dimensioned to keep said first and second permanent magnets a few centimeters away from the face of said display screen such that no appreciable loss of color purity because of change in magnetic field is apparent when said left and right doors are opened, resulting from the proximity of said first and second permanent magnets to the face of said display screen of said kinescope when said left and right doors have been closed.

48. A television receiver or computer monitor as set forth in claim 47 which is portable.

49. A television receiver or computer monitor as set forth in claim 48, which is child-transportable.

50. A television receiver or computer monitor as set forth in claim 47, wherein said cabinet can be swiveled on its said supporting base.

51. A television receiver or computer monitor as set forth in claim 47, wherein said cabinet can be tilted on its said supporting base.

52. A television receiver or computer monitor as set forth in claim 47, wherein said cabinet can be both swiveled and tilted on its said supporting base.

53. A television receiver or computer monitor comprising:

a kinescope with a display screen having a face;

a cabinet enclosing said television display device so as to leave the face of its said display screen exposed to view from a front side of said cabinet, which said display screen is mounted with its face substantially vertical as normally viewed, and has a left-hand side and a right-hand side as viewed from said front side of said cabinet, said cabinet having a left-hand side and a right-hand side and another side in addition to its said front side;

a left door hinged from said cabinet for covering the left-hand side of said display screen when closed and for extending from the left-hand side of said cabinet when opened;

a right door hinged from said cabinet for covering the right-hand side of said display screen when closed and for extending from the right-hand side of said cabinet when opened;

a left loudspeaker mounted within said left door;

a right loudspeaker mounted within said right door; and another loudspeaker mounted within said cabinet adjacent one of said sides of said cabinet.

54. A television receiver or computer monitor as set forth in claim 53 which is portable.

55. A television receiver or computer monitor as set forth in claim 54 which is child-transportable.

56. A television receiver or computer monitor as set forth in claim 53, further comprising a supporting base for supporting said cabinet.

57. A television receiver or computer monitor as set forth in claim 56, wherein said cabinet can be swiveled on its said supporting base.

58. A television receiver or computer monitor as set forth in claim 56, wherein said cabinet can be tilted on its said supporting base.

59. A television receiver or computer monitor as set forth in claim 56, wherein said cabinet can be both swiveled and tilted on its said supporting base.

60. A television receiver or computer monitor as set forth in claim 53, wherein the other loudspeaker comprises a woofer.

61. A television receiver or computer monitor as set forth in claim 60, wherein said cabinet comprises a top wall and wherein said woofer is mounted in said top wall.

62. A television receiver or computer monitor as set forth in claim 53, wherein said left door includes a left acoustic port and said right door includes a right acoustic port, said left and right acoustic ports radiating redirected sound from a back of said left loudspeaker and said right loudspeaker, respectively.

63. A television receiver or computer monitor as set forth in claim 53, wherein said left and right doors each have a plurality of cushioning bosses protruding from an inner surface for engaging said front side of said cabinet when said left and right doors are closed.

* * * * *